(12) United States Patent
Rothberg et al.

(10) Patent No.: US 11,808,700 B2
(45) Date of Patent: Nov. 7, 2023

(54) DATA ACQUISITION CONTROL FOR ADVANCED ANALYTIC INSTRUMENTS HAVING PULSED OPTICAL SOURCES

(71) Applicant: Quantum-Si Incorporated, Guilford, CT (US)

(72) Inventors: Jonathan M. Rothberg, Guilford, CT (US); Benjamin Cipriany, Branford, CT (US); Faisal R. Ahmad, Guilford, CT (US); Joseph D. Clark, Litchfield, NH (US); Daniel B. Frier, Middlefield, CT (US); Michael Ferrigno, Farmington, CT (US); Mel Davey, Westbrook, CT (US); Tom Thurston, Guilford, CT (US); Brett J. Gyarfas, Guilford, CT (US); Todd Rearick, Cheshire, CT (US); Jeremy Christopher Jordan, Cromwell, CT (US)

(73) Assignee: Quantum-Si Incorporated, Branford, CT (US)

( * ) Notice: Subject to any disclaimer, the term of this patent is extended or adjusted under 35 U.S.C. 154(b) by 1061 days.

(21) Appl. No.: 16/442,206

(22) Filed: Jun. 14, 2019

(65) Prior Publication Data
US 2019/0383737 A1 Dec. 19, 2019

Related U.S. Application Data

(60) Provisional application No. 62/685,717, filed on Jun. 15, 2018.

(51) Int. Cl.
*G01N 21/64* (2006.01)
*G06F 1/08* (2006.01)

(52) U.S. Cl.
CPC ..... *G01N 21/6402* (2013.01); *G01N 21/6486* (2013.01); *G06F 1/08* (2013.01);
(Continued)

(58) Field of Classification Search
CPC .......... G01N 21/6402; G01N 21/6486; G01N 2021/6495; G01N 2201/125;
(Continued)

(56) References Cited

U.S. PATENT DOCUMENTS 4,034,949 A 7/1977 Hoesterey et al.
4,118,109 A 10/1978 Crawford et al.
(Continued)

FOREIGN PATENT DOCUMENTS

CA 101938081 A 1/2011
CN 1242884 A 1/2000
(Continued)

OTHER PUBLICATIONS

U.S. Appl. No. 15/161,088, filed May 20, 2016, Rothberg et al.
(Continued)

*Primary Examiner* — Kiho Kim
(74) *Attorney, Agent, or Firm* — Wolf, Greenfield & Sacks, P.C.

(57) ABSTRACT

Instrument control and data acquisition in advanced analytic systems that utilize optical pulses for sample analysis are described. Clocking signals for data acquisition, data processing, communication, and/or other data handling functionalities can be derived from an on-board pulsed optical source, such as a passively mode-locked laser. The derived clocking signals can operate in combination with one or more clocking signals from a stable oscillator, so that instrument operation and data handling can tolerate interruptions in operation of the pulsed optical source.

36 Claims, 13 Drawing Sheets

(52) U.S. Cl.
CPC ............... *G01N 2021/6495* (2013.01); *G01N 2201/125* (2013.01); *G01N 2201/126* (2013.01)

(58) Field of Classification Search
CPC ........... G01N 2201/126; G01N 21/648; G01N 21/6454; G01N 21/6408; G06F 1/08
See application file for complete search history.

(56) References Cited

U.S. PATENT DOCUMENTS

| | | | |
|---|---|---|---|
| 4,295,226 A | 10/1981 | Dombrowski | |
| 4,850,686 A | 7/1989 | Morimoto et al. | |
| 5,108,179 A | 4/1992 | Myers | |
| 5,196,709 A | 3/1993 | Berndt et al. | |
| 5,471,515 A | 11/1995 | Fossum et al. | |
| 5,627,853 A | 5/1997 | Mooradian et al. | |
| 5,674,743 A | 10/1997 | Ulmer | |
| 5,822,472 A | 10/1998 | Danielzik et al. | |
| 5,854,651 A | 12/1998 | Kessler et al. | |
| 5,961,924 A | 10/1999 | Reichert et al. | |
| 6,175,670 B1 | 1/2001 | Bergmann | |
| 6,185,235 B1 | 2/2001 | Cheng et al. | |
| 6,205,266 B1 | 3/2001 | Palen et al. | |
| 6,355,420 B1 | 3/2002 | Chan | |
| 6,393,035 B1 | 5/2002 | Weingarten et al. | |
| 6,437,345 B1 | 8/2002 | Bruno-Raimondi et al. | |
| 6,473,250 B1 | 10/2002 | Chapman et al. | |
| 6,545,759 B1 | 4/2003 | Hartman | |
| 6,618,423 B1 | 9/2003 | Dekorsky et al. | |
| 6,628,850 B1 | 9/2003 | Yao | |
| 6,715,685 B2 | 4/2004 | Dvorkis | |
| 6,716,394 B2 | 4/2004 | Jensen et al. | |
| 6,750,969 B2 | 6/2004 | Richard et al. | |
| 6,787,308 B2 | 9/2004 | Balasubramanian et al. | |
| 6,825,921 B1 | 11/2004 | Modlin et al. | |
| 6,834,064 B1 | 12/2004 | Paschotta et al. | |
| 6,847,450 B2 | 1/2005 | Richard et al. | |
| 6,917,726 B2 | 7/2005 | Levene et al. | |
| 7,052,847 B2 | 5/2006 | Korlach et al. | |
| 7,170,050 B2 | 1/2007 | Turner et al. | |
| 7,175,811 B2 | 2/2007 | Bach et al. | |
| 7,179,654 B2 | 2/2007 | Verdonk et al. | |
| 7,394,841 B1 | 7/2008 | Konttinen et al. | |
| 7,426,322 B2 | 9/2008 | Hyde | |
| 7,595,883 B1 | 9/2009 | El Gamal et al. | |
| 7,738,086 B2 | 6/2010 | Shepard et al. | |
| 7,742,510 B2 | 6/2010 | Essaian et al. | |
| 7,820,983 B2 | 10/2010 | Lundquist et al. | |
| 7,834,329 B2 | 11/2010 | Lundquist et al. | |
| 7,838,847 B2 | 11/2010 | Lundquist et al. | |
| 7,873,085 B2 | 1/2011 | Babushkin et al. | |
| 7,968,702 B2 | 6/2011 | Wegener et al. | |
| 7,981,604 B2 | 7/2011 | Quake | |
| 8,053,742 B2 | 11/2011 | Lundquist et al. | |
| 8,207,509 B2 | 6/2012 | Lundquist et al. | |
| 8,252,911 B2 | 8/2012 | Bjornson et al. | |
| 8,274,040 B2 | 9/2012 | Zhong et al. | |
| 8,278,728 B2 | 10/2012 | Murshid | |
| 8,279,901 B2 | 10/2012 | Karavitis | |
| 8,465,699 B2 | 6/2013 | Fehr et al. | |
| 8,471,219 B2 | 6/2013 | Lundquist et al. | |
| 8,471,230 B2 | 6/2013 | Zhong et al. | |
| 8,501,406 B1 | 8/2013 | Gray et al. | |
| 8,502,169 B2 | 8/2013 | Rigneault et al. | |
| 8,618,507 B1 | 12/2013 | Lundquist et al. | |
| 8,865,077 B2 | 10/2014 | Chiou et al. | |
| 8,953,651 B2 | 2/2015 | Karavitis | |
| 9,029,802 B2 | 5/2015 | Lundquist et al. | |
| 9,054,479 B2 | 6/2015 | Karavitis | |
| 9,157,864 B2 | 10/2015 | Fehr et al. | |
| 9,222,123 B2 | 12/2015 | Zhong et al. | |
| 9,222,133 B2 | 12/2015 | Lundquist et al. | |
| 9,223,084 B2 | 12/2015 | Grot et al. | |
| 9,318,867 B2 | 4/2016 | Pronin et al. | |
| 9,325,148 B2 | 4/2016 | Karavitis | |
| 9,372,308 B1 | 6/2016 | Saxena et al. | |
| 9,587,276 B2 | 3/2017 | Lundquist et al. | |
| 9,606,060 B2 | 3/2017 | Chen et al. | |
| 9,617,594 B2 | 4/2017 | Rothberg et al. | |
| 9,658,161 B2 | 5/2017 | Saxena et al. | |
| 9,666,748 B2 | 5/2017 | Leobandung | |
| 9,719,138 B2 | 8/2017 | Zhong et al. | |
| 9,765,395 B2 | 9/2017 | Goldsmith | |
| 9,946,017 B2 | 4/2018 | Saxena et al. | |
| 10,018,764 B2 | 7/2018 | Grot et al. | |
| 10,090,429 B2 | 10/2018 | Leobandung | |
| 10,138,515 B2 | 11/2018 | Fehr et al. | |
| 10,246,742 B2 | 4/2019 | Rothberg et al. | |
| 10,280,457 B2 | 5/2019 | Zhong et al. | |
| 10,283,928 B2 | 5/2019 | Rothberg et al. | |
| 10,310,178 B2 | 6/2019 | Saxena et al. | |
| 10,487,356 B2 | 11/2019 | Lundquist et al. | |
| 10,551,624 B2 | 2/2020 | Rothberg et al. | |
| 10,578,788 B2 | 3/2020 | Grot et al. | |
| 10,605,730 B2 | 3/2020 | Rothberg et al. | |
| 10,655,172 B2 | 5/2020 | Rank et al. | |
| 10,712,433 B2 | 7/2020 | Carothers | |
| 10,724,090 B2 | 7/2020 | McCaffrey et al. | |
| 10,741,990 B2 | 8/2020 | Rothberg et al. | |
| 11,249,318 B2 | 2/2022 | Rothberg et al. | |
| 11,322,906 B2 | 5/2022 | Rothberg et al. | |
| 11,466,316 B2 | 10/2022 | Rothberg et al. | |
| 2001/0050821 A1 | 12/2001 | Bickleder et al. | |
| 2002/0141473 A1 | 10/2002 | Cordingley et al. | |
| 2002/0182716 A1 | 12/2002 | Weisbuch et al. | |
| 2003/0058904 A1 | 3/2003 | Krainer et al. | |
| 2003/0151053 A1 | 8/2003 | Sun et al. | |
| 2003/0169784 A1 | 9/2003 | Sutter et al. | |
| 2003/0174992 A1 | 9/2003 | Levene et al. | |
| 2003/0179786 A1 | 9/2003 | Kopf | |
| 2004/0028090 A1 | 2/2004 | Pask et al. | |
| 2004/0047387 A1 | 3/2004 | Bunting et al. | |
| 2004/0169842 A1 | 9/2004 | Dosluoglu et al. | |
| 2004/0257140 A1 | 12/2004 | Bergmann et al. | |
| 2005/0048529 A1 | 3/2005 | McSwiggen | |
| 2006/0000814 A1 | 1/2006 | Gu et al. | |
| 2006/0029110 A1 | 2/2006 | Cho et al. | |
| 2006/0269190 A1 | 11/2006 | Kim et al. | |
| 2008/0130099 A1 | 6/2008 | Harter | |
| 2008/0175284 A1 | 7/2008 | Konttinen et al. | |
| 2008/0198466 A1 | 8/2008 | Plotkin et al. | |
| 2009/0180500 A1 | 7/2009 | Babushkin et al. | |
| 2009/0225799 A1 | 9/2009 | Hasegawa | |
| 2010/0021180 A1 | 1/2010 | Uemura et al. | |
| 2010/0065726 A1 | 3/2010 | Zhong et al. | |
| 2010/0173394 A1 | 7/2010 | Colston et al. | |
| 2010/0245354 A1 | 9/2010 | Rousso et al. | |
| 2010/0254022 A1 | 10/2010 | O'Shaughnessy | |
| 2010/0255487 A1 | 10/2010 | Beechem et al. | |
| 2010/0327762 A1 | 12/2010 | Yang | |
| 2011/0136201 A1 | 6/2011 | Mao et al. | |
| 2011/0165652 A1 | 7/2011 | Hardin et al. | |
| 2011/0170566 A1 | 7/2011 | Holtom | |
| 2011/0206070 A1 | 8/2011 | Karavitis | |
| 2011/0206071 A1 | 8/2011 | Karavitis | |
| 2011/0206072 A1 | 8/2011 | Karavitis | |
| 2011/0206073 A1 | 8/2011 | Karavitis | |
| 2011/0236983 A1 | 9/2011 | Beechem et al. | |
| 2012/0039345 A1 | 2/2012 | Fan et al. | |
| 2012/0081040 A1 | 4/2012 | Ku | |
| 2012/0282391 A1 | 11/2012 | Palmaz et al. | |
| 2013/0051411 A1 | 2/2013 | Kim et al. | |
| 2013/0071849 A1 | 3/2013 | Kong et al. | |
| 2013/0116153 A1 | 5/2013 | Bowen et al. | |
| 2014/0024020 A1* | 1/2014 | Tanabe | G01N 21/6408 435/5 |
| 2014/0154792 A1* | 6/2014 | Moynihan | G01N 33/5302 422/69 |
| 2014/0286364 A1 | 9/2014 | Pronin et al. | |
| 2015/0293021 A1 | 10/2015 | Finkelstein et al. | |
| 2015/0355469 A1 | 12/2015 | Oguri et al. | |
| 2016/0002088 A1 | 1/2016 | Mizumura et al. | |
| 2016/0084761 A1 | 3/2016 | Rothberg et al. | |

(56) References Cited

U.S. PATENT DOCUMENTS

| | | |
|---|---|---|
| 2016/0231549 A1 | 8/2016 | Bosworth et al. |
| 2016/0238532 A1 | 8/2016 | Freudiger et al. |
| 2016/0336709 A1 | 11/2016 | Manni |
| 2016/0341664 A1 | 11/2016 | Rothberg et al. |
| 2016/0344156 A1 | 11/2016 | Rothberg et al. |
| 2016/0369332 A1 | 12/2016 | Rothberg et al. |
| 2017/0146479 A1 | 5/2017 | Levine et al. |
| 2017/0160541 A1 | 6/2017 | Carothers et al. |
| 2018/0115136 A1 | 4/2018 | Delfyett et al. |
| 2018/0173000 A1 | 6/2018 | Rothberg et al. |
| 2018/0175582 A1 | 6/2018 | Rothberg et al. |
| 2019/0249240 A1 | 8/2019 | Rothberg et al. |
| 2019/0292590 A1 | 9/2019 | Zhong et al. |
| 2019/0383737 A1* | 12/2019 | Rothberg ........... G01N 21/6408 |
| 2019/0391328 A1 | 12/2019 | Li et al. |
| 2020/0124864 A1 | 4/2020 | Rothberg et al. |
| 2020/0158640 A1 | 5/2020 | Rothberg et al. |
| 2020/0220317 A1 | 7/2020 | Rothberg et al. |
| 2020/0335933 A1 | 10/2020 | Rothberg et al. |
| 2020/0393616 A1 | 12/2020 | Schmid et al. |
| 2021/0218218 A1 | 7/2021 | Bellos et al. |
| 2021/0277463 A1 | 9/2021 | Rothberg et al. |
| 2022/0128828 A1 | 4/2022 | Rothberg et al. |
| 2022/0209492 A1 | 6/2022 | Rothberg et al. |

FOREIGN PATENT DOCUMENTS

| | | |
|---|---|---|
| CN | 101387750 A | 3/2009 |
| CN | 101414729 A | 4/2009 |
| CN | 101572380 A | 11/2009 |
| CN | 101636886 A | 1/2010 |
| CN | 101915752 A | 12/2010 |
| CN | 102549478 A | 7/2012 |
| CN | 102789055 A | 11/2012 |
| CN | 102832536 A | 12/2012 |
| CN | 103502471 A | 1/2014 |
| CN | 103765704 A | 4/2014 |
| CN | 203774604 U | 8/2014 |
| CN | 104078839 A | 10/2014 |
| CN | 104201547 A | 12/2014 |
| CN | 104518419 A | 4/2015 |
| CN | 102292671 | 10/2015 |
| CN | 106029904 A | 10/2016 |
| DE | 10 2009 036273 A1 | 2/2011 |
| EP | 0472318 A2 | 2/1992 |
| EP | 0542480 A2 | 5/1993 |
| EP | 0601714 A1 | 6/1994 |
| EP | 1681356 A1 | 7/2006 |
| EP | 2182523 A1 | 5/2010 |
| EP | 3296783 A1 | 3/2018 |
| ES | 2329206 A1 | 11/2009 |
| IE | 2006/0447 A1 | 4/2009 |
| JP | S63-17581 A | 1/1988 |
| JP | H05-243660 A | 9/1993 |
| JP | H05-275780 A | 10/1993 |
| JP | H05-283766 A | 10/1993 |
| JP | H07-221374 A | 8/1995 |
| JP | H08-506664 A | 7/1996 |
| JP | H08-340154 A | 12/1996 |
| JP | H10-3022 A | 1/1998 |
| JP | H11-505370 A | 5/1999 |
| JP | 2000-155052 A2 | 6/2000 |
| JP | 2001-25102 A | 1/2001 |
| JP | 2001-077449 A | 3/2001 |
| JP | 2001-142035 A | 5/2001 |
| JP | 2001-251002 A | 9/2001 |
| JP | 2002-239773 A | 8/2002 |
| JP | 2002-368313 A | 12/2002 |
| JP | 2003-500861 A | 1/2003 |
| JP | 2003-168240 A | 6/2003 |
| JP | 2003-177328 A | 6/2003 |
| JP | 2004-520709 A | 7/2004 |
| JP | 2004-363419 A | 12/2004 |
| JP | 2005-512086 A | 4/2005 |
| JP | 2005-524051 A | 8/2005 |
| JP | 2006-48885 A | 2/2006 |
| JP | 2007-511079 A | 4/2007 |
| JP | 2007-520735 A | 7/2007 |
| JP | 2008-28379 A | 2/2008 |
| JP | 2009-122493 A | 6/2009 |
| JP | 2009-277754 A | 11/2009 |
| JP | 2010-103291 A | 5/2010 |
| JP | 2010-204006 A | 9/2010 |
| JP | 2011-119393 A | 6/2011 |
| JP | 2011-518445 A | 6/2011 |
| JP | 2011-229660 A | 11/2011 |
| JP | 2012-32183 A | 2/2012 |
| JP | 2012-98299 A | 5/2012 |
| JP | 2010-074198 A | 8/2012 |
| JP | 2012-150186 A | 8/2012 |
| JP | 2012-242626 A | 12/2012 |
| JP | 2013-104876 A | 5/2013 |
| JP | 2013-518302 A | 5/2013 |
| JP | 2013-520848 A | 6/2013 |
| JP | 2014-150210 A | 8/2014 |
| JP | 2014-531777 A | 11/2014 |
| JP | 2015-015337 A | 1/2015 |
| JP | 2015-501415 A | 1/2015 |
| JP | 2016-502290 A | 1/2016 |
| KR | 590565 B1 | 6/2006 |
| KR | 10-2006-0121900 A | 11/2006 |
| TW | 200909794 A | 3/2009 |
| TW | 201022719 A | 6/2010 |
| TW | 201440942 A | 11/2014 |
| WO | WO 94/18218 A1 | 8/1994 |
| WO | WO 02/11252 A2 | 2/2002 |
| WO | WO 03/021212 A1 | 3/2003 |
| WO | WO 2005/073407 A1 | 8/2005 |
| WO | WO 2008/087253 A1 | 7/2008 |
| WO | WO 2011/091316 A2 | 7/2011 |
| WO | WO 2011/153962 A1 | 12/2011 |
| WO | WO 2012/133292 A1 | 4/2012 |
| WO | WO 2014/107294 A2 | 7/2014 |
| WO | WO 2014/142981 A1 | 9/2014 |
| WO | WO 2016/187564 A1 | 11/2016 |

OTHER PUBLICATIONS

U.S. Appl. No. 15/255,624, filed Sep. 2, 2016, Rothberg et al.
U.S. Appl. No. 15/161,067, filed May 20, 2016, Rothberg et al.
U.S. Appl. No. 15/842,720, filed Dec. 14, 2017, Rothberg et al.
U.S. Appl. No. 15/844,469, filed Dec. 15, 2017, Rothberg et al.
U.S. Appl. No. 16/362,830, filed Mar. 25, 2019, Rothberg et al.
PCT/US2016/033576, Aug. 24, 2016, Invitation to Pay Additional Fees.
PCT/US2016/033576, Nov. 4, 2016, International Search Report and Written Opinion.
PCT/US2016/033576, Nov. 30, 2017, International Preliminary Report on Patentability.
PCT/US2016/033585, Sep. 21, 2016, Invitation to Pay Additional Fees.
PCT/US2016/033585, Nov. 11, 2016, International Search Report and Written Opinion.
PCT/US2016/033585, Nov. 30, 2017, International Preliminary Report on Patentability.
PCT/US2017/066878, Mar. 15, 2018, International Search Report and Written Opinion.
PCT/US2017/066878, Jun. 27, 2019, International Preliminary Report on Patentability.
PCT/US2019/037354, Sep. 25, 2019, Invitation to Pay Additional Fees.
Hale, Fibre Optic Sensors using Adiabatically Tapered Single Mode Fibres. Dissertation submitted to the University of Cambridge. Feb. 1994. 209 pages.
Mogensen et al., A Microfluidic Device with an Integrated Waveguide Beam Splitter for Velocity Measurements of Flowing Particles by Fourier Transformation. Analytical Chemistry. Sep. 15, 2003;75(18):4931-4936.
Taitt et al., Evanescent wave fluorescence biosensors. Biosens Bioelectron. Jun. 2005;20(12):2470-87. Epub Dec. 8, 2004.
U.S. Appl. No. 16/916,277, filed Jun. 30, 2020, Rothberg et al.

(56) References Cited

OTHER PUBLICATIONS

Stultz et al., Short pulse, high-repetition rate, passively Q-switched Er: yttrium-aluminum-garnet laser at 1.6 microns. Applied Physics Letters. Dec. 12, 2005;87(24):241118.
U.S. Appl. No. 16/277,113, filed Feb. 15, 2019, Rothberg et al.
U.S. Appl. No. 16/751,135, filed Jan. 23, 2020, Rothberg et al.
U.S. Appl. No. 16/721,611, filed Dec. 19, 2019, Rothberg et al.
PCT/US2019/037354, Nov. 19, 2019, International Search Report and Written Opinion.
International Preliminary Report on Patentability for International Application No. PCT/US2016/033585 dated Nov. 30, 2017.
International Preliminary Report on Patentability for International Application No. PCT/US2016/033576 dated Nov. 30, 2017.
International Preliminary Report on Patentability for International Application No. PCT/US2017/066878 dated Jun. 27, 2019.
International Search Report and Written Opinion for International Application No. PCT/US2016/033576 dated Nov. 4, 2016.
International Search Report and Written Opinion for International Application No. PCT/US2016/033585 dated Nov. 11, 2016.
International Search Report and Written Opinion for International Application No. PCT/US2017/066878 dated Mar. 15, 2018.
Invitation to Pay Additional Fees for International Application No. PCT/US2016/033576 dated Aug. 24, 2016.
Invitation to Pay Additional Fees for International Application No. PCT/US2016/033585 dated Sep. 21, 2016.
Invitation to Pay Additional Fees for International Application No. PCT/US2019/037354 dated Sep. 25, 2019.
[No Author Listed] Semiconductor Components Industries, LLC, MC10EP05, MC100EP05. 3.3V/5V ECL 2-input differential and/nand. Aug. 2008. 11 Pages.
Araki et al., An ultraviolet nanosecond light pulse generator using a light emiting diode for test of photodetectors. Rev. Sci. Instr. Mar. 1997;68:1364-8.
Binh et al., A simple sub-nanosecond ultraviolet light pulse generator with high repetition rate and peak power. Rev. Sci. Instr. 2013;84:083102.1-083102.5.
Champak et al., Ultrafast pulse generation in a mode-locked Erbium chip waveguide laser. Opt. Express 24. 2016. 8 pages.
Huang et al., Gene expression analysis with an integrated CMOS microarray by time-resolved fluorescence detection. Biosensors and Bioelectronics. 2012;26(5):2660-5.
Huang et al., Slab-coupled Optical Waveguide Lasers Emerge from a Multimode Sea. www.photonics.com, Oct. 2006. 10 Pages.
Kwon et al., Ultrashort stretched-pulse L-band laser using carbon-nanotube saturable absorber. Opt. Express 23, 7779-7785. 2015.
Lu et al., Terahertz Microchip for Illicit Drug Detection. IEEE Photonics Technology Letters. 2006;18(21):2254-6.
Pfeufer et al., A ddT ddA ddG ddC Length-sorted strands fow through a capillary Detector Final output Focused laser beam Fluorescence Fluorescently teminated oligonucleotides Original DNA strand Genetics/DNA Sequencing. 2015;24-7.
Sauer et al., Time-Resolved Identification of Individual Mononucleotide Molecules in Aqueous Solution with Pulsed Semiconductor Lasers. Bioimaging, Institute of Physics. 1998;6(1):14-24.
Uhring et al., A low-cost high-repetition-rate picosecond laser diode pulse generator. Optical Sensing II. 2004;5452:583-90.

International Search Report and Written Opinion for International Application No. PCT/US2019/037354 dated Nov. 19, 2019.
U.S. Appl. No. 17/314,968, filed May 7, 2021, Rothberg et al.
U.S. Appl. No. 17/566,765, filed Dec. 31, 2021, Rothberg et al.
U.S. Appl. No. 17/696,755, filed Mar. 16, 2022, Rothberg et al.
PCT/US2020/030345, Dec. 23, 2021, International Preliminary Report on Patentability.
EP 21217400.7, Jul. 28, 2022, Extended European Search Report.
PCT/US2021/013320, Jul. 28, 2022, International Preliminary Report on Patentability.
U.S. Appl. No. 16/861,399, filed Apr. 29, 2020, Schmid et al.
U.S. Appl. No. 17/148,515, filed Jan. 13, 2021, Bellos et al.
PCT/US2017/066348, Mar. 8, 2018, Invitation to Pay Additional Fees.
PCT/US2017/066348, Jun. 27, 2019, International Preliminary Report on Patentability.
PCT/US2017/066348, May 4, 2018, International Search Report and Written Opinion.
PCT/US2020/030345, Aug. 13, 2020, Invitation to Pay Additional Fees.
PCT/US2020/030345, Oct. 19, 2020, International Search Report and Written Opinion.
PCT/US2021/013320, May 10, 2021, Invitation to Pay Additional Fees.
PCT/US2021/013320, Jul. 1, 2021, International Search Report and Written Opinion.
International Preliminary Report on Patentability for International Application No. PCT/US2017/066348 dated Jun. 27, 2019.
International Search Report and Written Opinion for International Application No. PCT/US2017/066348 dated May 4, 2018.
Invitation to Pay Additional Fees for International Application No. PCT/US2017/066348 dated Mar. 8, 2018.
Invitation to Pay Additional Fees for International Application No. PCT/US2020/030345 dated Aug. 13, 2020.
International Search Report and Written Opinion for International Application No. PCT/US2020/030345 dated Oct. 19, 2020.
Invitation to Pay Additional Fees for International Application No. PCT/US2021/013320 dated May 10, 2021.
International Search Report and Written Opinion for International Application No. PCT/US2021/013320 dated Jul. 1, 2021.
Taillaert et al., Grating couplers for coupling between optical fibers and nanophotonic waveguides. Japanese Journal of Applied Physics. 2006;45(8A):6071-7.
Villafana-Rauda et al., Dynamics of a Q-switched Nd: YVO4/Cr: YAG laser under periodic modulation. Results in Physics. Mar. 1, 2019;12:908-13.
Zhang et al., Square-wave pulse with ultra-wide tuning range in a passively mode-locked fiber laser. Optics letters. Apr. 15, 2012;37(8):1334-6.
International Preliminary Report on Patentability for International Application No. PCT/US2020/030345 dated Dec. 23, 2021.
Extended European Search Report for European Application No. 21217400.7 dated Jul. 28, 2022.
International Preliminary Report on Patentability for International Application No. PCT/US2021/013320 dated Jul. 28, 2022.
Rae et al., A vertically integrated CMOS microsystem for time-resolved fluorescence analysis. IEEE Transactions on Biomedical Circuits and Systems. Nov. 22, 2010;4(6):437-44.

* cited by examiner

DATA ACQUISITION CONTROL FOR ADVANCED ANALYTIC INSTRUMENTS HAVING PULSED OPTICAL SOURCES

RELATED APPLICATION

This Application claims priority under 35 U.S.C. § 119(e) to U.S. Provisional Application Ser. No. 62/685,717, entitled "DATA ACQUISITION CONTROL FOR ADVANCED ANALYTIC INSTRUMENTS HAVING PULSED OPTICAL SOURCES" filed Jun. 15, 2018, which is herein incorporated by reference in its entirety.

FIELD

The present application relates to data acquisition and control in advanced analytic instruments that include an optical source for producing a sequence of optical pulses.

RELATED ART

In the area of instrumentation for sample analyses, pulsed optical sources can be used to deliver optical excitation energy in the form of a sequence of optical pulses to a plurality of sample wells that contain samples to be analyzed. For biochemical applications, the sample wells can contain biological, chemical, and/or biochemical specimens that are to be analyzed. In some cases, the sample wells are configured as reaction chambers in which nucleic acid sequencing can be carried out. In other cases, the sample wells may contain other types of specimens under study. The specimens, or a component with which the specimens react, may be tagged with one or more fluorophores, for example, and emit radiation when excited by the optical pulses delivered to the sample wells. Detection of fluorescent emission from the sample wells can provide information about the specimens.

SUMMARY

Apparatus and methods relating to instrument control and data acquisition in advanced analytic systems that utilize optical pulses for sample analysis are described. In embodiments, clocking signals for data acquisition, data processing, and/or other data handling functionalities can be derived from an on-board pulsed optical source, such as a passively mode-locked laser. The derived clocking signals can operate in combination with one or more clocking signals from a stable oscillator, so that instrument operation and data handling can tolerate interruptions in operation of the pulsed optical source.

Some embodiments relate to an analytic instrument comprising a pulsed optical source configured to output a sequence of optical pulses for analysis of a sample and clock-generation circuitry configured to produce a first clock signal derived from the sequence of optical pulses and a second clock signal that is not derived from the sequence of optical pulses and use the first clock signal and second clock signal to validate data acquisitions for analysis of the sample.

Some embodiments relate to a method of operating an analytic instrument, the method comprising detecting a sequence of optical pulses and generating a first clock signal derived from the sequence of optical pulses; providing the optical pulses for analysis of a sample; generating a second clock signal from an oscillator that is not synchronized to the sequence of optical pulses; and providing the first clock signal and second clock signal to a data processor for validating data acquisition operations during the analysis of the sample.

Some embodiments relate to an analytic instrument comprising an interface module arranged to receive an optoelectronic chip that can be mounted and removed from a receptacle of the interface module, wherein the optoelectronic chip is configured to hold a sample for analysis. The instrument can further include a pulsed optical source configured to output a sequence of optical pulses, a data processor arranged to receive and process signals transmitted from the interface module, a clock-detection circuit having a detector arranged to detect optical pulses produced by the pulse optical source and output a clocking signal, and clock-generation circuitry arranged to receive the clocking signal and output a first clock signal and a second clock signal, wherein the first clock signal is synchronized to the optical pulses and the second clock signal is not synchronized to the optical pulses. The instrument can further include a first clock signal path providing the first clock signal to the interface module for timing data acquisition operations of the optoelectronic chip, a second clock signal path providing the second clock signal to the data processor, and a third clock signal path providing the first clock signal to the data processor, wherein the data processor is configured to detect synchronization discrepancies between the first clock signal and the second clock signal and compensate data-processing operations in response to detecting synchronization discrepancies.

Some embodiments relate to a method for timing charge-accumulation intervals in a photodetector. The method can comprise acts of providing optical excitation pulses to excite a sample; generating a first clock signal that is synchronized to the optical excitation pulses; initiating, with the first clock signal, a starting time of a first charge-accumulation interval for the photodetector; delaying the first clock signal while detecting an output from the photodetector; recording signal levels from a first charge-accumulation interval as a function of delay of the first clock signal; identifying a reference point in the recorded signal levels; and setting a delay of the first clock signal such that the starting time is delayed from the reference point by a predetermined amount.

The foregoing and other aspects, implementations, acts, functionalities, features and, embodiments of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

FIG. 1-1B depicts a compact mode-locked laser module incorporated into an analytical instrument, according to some embodiments.

FIG. 1-2 depicts a train of optical pulses, according to some embodiments.

FIG. 1-3 depicts an example of parallel reaction chambers that can be excited optically by a pulsed laser via one or more waveguides and corresponding detectors for each chamber, according to some embodiments.

FIG. 1-4 illustrates optical excitation of a reaction chamber from a waveguide, according to some embodiments.

FIG. 1-5 depicts further details of an integrated reaction chamber, optical waveguide, and time-binning photodetector, according to some embodiments.

FIG. 1-6 depicts an example of a biological reaction that can occur within a reaction chamber, according to some embodiments.

FIG. 1-7 depicts emission probability curves for two different fluorophores having different decay characteristics.

FIG. 1-8 depicts time-binning detection of fluorescent emission, according to some embodiments.

FIG. 1-9 depicts a time-binning photodetector, according to some embodiments.

FIG. 1-10A depicts pulsed excitation and time-binned detection of fluorescent emission from a sample, according to some embodiments.

FIG. 1-10B depicts a histogram of accumulated fluorescent photon counts in various time bins after repeated pulsed excitation of a sample, according to some embodiments.

FIG. 1-11A-1-11D depict different histograms that may correspond to the four nucleotides (T, A, C, G) or nucleotide analogs, according to some embodiments.

FIG. 2-1 depicts an example of a system for synchronizing instrument electronics to timing of optical pulses, according to some embodiments.

FIG. 2-2 depicts an example of clock-detection circuitry for an analytical instrument that incorporates a pulsed optical source, according to some embodiments.

FIG. 2-3 depicts an example of clock-generation circuitry and data-acquisition and data-processing components, according to some embodiments.

FIG. 3-1 illustrates example timing of data acquisition, according to some embodiments.

FIG. 3-2 is an example of a normalized optical pulse profile plotted on a log scale that can be used to represent a number of photons received at a sample well.

FIG. 3-3 plots measured signal levels recorded for a charge-accumulation interval of a time-binning photodetector that has been swept in time with respect to the arrival time $t_e$ of an excitation optical pulse at a sample well.

FIG. 3-4 illustrates an example of a calibration procedure for data acquisition on an optoelectronic chip.

FIG. 4-1 depicts an example of system architecture for an advanced analytic instrument, according to some embodiments.

FIG. 4-2 depicts instrument operation services available over a network, according to some embodiments.

Figures 1, 1A:
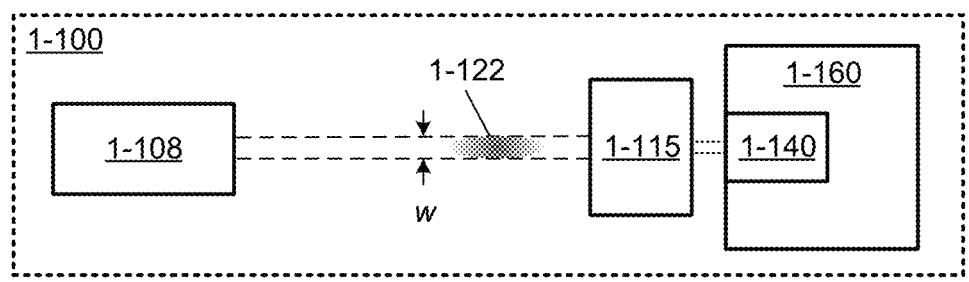
FIG. 1-1A is a block diagram depiction of an analytical instrument that includes a compact mode-locked laser module, according to some embodiments.

The features and advantages of the present invention will become more apparent from the detailed description set forth below when taken in conjunction with the drawings. When describing embodiments in reference to the drawings, directional references ("above," "below," "top," "bottom," "left," "right," "horizontal," "vertical," etc.) may be used. Such references are intended merely as an aid to the reader viewing the drawings in a normal orientation. These directional references are not intended to describe a preferred or only orientation of features of an embodied device. A device may be embodied using other orientations.

DETAILED DESCRIPTION

I. Introduction

In advanced analytic systems, such as those described in U.S. patent publication No. 2015/0141267 and in U.S. Pat. No. 9,617,594, both of which are incorporated herein by reference, there can be a large number of pixels having sample wells at which specimens are to be analyzed in a massively parallel operation. In some embodiments, the sample wells can be integrated onto an optoelectronic chip that mounts into the instrument. For example, the number of sample wells on such a chip can be between about 10,000 and about 10,000,000. In some embodiments, the chip can be disposable and interchangeably mount into a receptacle of an advanced analytic instrument by a user and interface with optical and electronic components in the instrument. In embodiments, the instrument can be portable and the chip can be disposable and easily replaced by a user for each new sample analysis.

The inventors have recognized and appreciated that acquiring and handling data collected from such a large number of sample wells in a massively parallel operation is a complex task that, if not done correctly, can result in failed or incorrect sample analysis. For example, in some applications, nucleic acid sequencing reactions may be performed at a large number of sample wells in parallel (e.g., thousands or millions of sample wells). During the sequencing reactions, target nucleic acid molecules can undergo extension reactions in the sample wells and repeatedly incorporate nucleotides or nucleotide analogs into growing strands that are complementary to the target nucleic acid molecules. Each incorporation event can last less than 100 milliseconds. During an incorporation event, optical emission from one or more fluorophores linked to a nucleotide can be low level and may require multiple excitations by optical pulses throughout the incorporation event to obtain sufficient signal levels. Continuous detection for all active sample wells so that incorporation events will not be missed can require careful timing of data acquisition on the chip, high data acquisition rates, and large amounts of data that must be captured and transmitted off the chip for subsequent processing.

Described herein are apparatus and methods relating to advanced analytic instrument control and data acquisition. In embodiments, instrument clocking signals can be derived from a pulsed optical source and used for aspects of data acquisition, data processing, and/or data transmission. The described methods include steps to improve the quality of acquired data. The apparatus and methods are useful for various aspects of data handling in such advanced analytic instruments.

II. Example Bioanalytic Application

By way of explanation, a bioanalytic application is described in which a compact pulsed optical source (a mode-locked laser module in this example) is used to excite fluorophores in a plurality of reaction chambers on an optoelectronic chip. Emission from the fluorophores may be used to determine characteristics (e.g., structure information) of a specimen in each reaction chamber. In some cases, emission from the fluorophores may be used to determine sequence information of DNA or a protein. The optical source and optoelectronic chip can be parts of a portable, advanced analytic instrument. In embodiments, the term "optical" may refer to ultra-violet, visible, near-infrared, and short-wavelength infrared spectral bands. The optoelectronic chip can carry samples to be analyzed, can be disposable, and can be easily mounted in the instrument. When mounted in a receptacle of the instrument, the chip can be in optical and electronic communication with optical and electronic devices within the analytic instrument. The instrument can also include hardware for an external interface, so that data from the chip can be communicated to an external network. Although various types of analyses can be performed on various samples, the following explanation describes genetic sequencing. However, the invention is not limited to instruments configured for genetic sequencing.

In overview and referring to FIG. 1-1A, a portable, advanced analytic instrument 1-100 can comprise one or more pulsed optical sources 1-108 mounted as a replaceable module within, or otherwise coupled to, the instrument 1-100. The portable analytic instrument 1-100 can include an optical coupling system 1-115 and an analytic system 1-160. The optical coupling system 1-115 can include some combination of optical components (which may include, for example, none, one, or more of each of: lens, mirror, optical filter, attenuator, beam-steering component, beam shaping component) and be configured to operate on and/or couple output optical pulses 1-122 from the pulsed optical source 1-108 to the analytic system 1-160. The analytic system 1-160 can include a plurality of components that are arranged to direct the optical pulses to at least one sample that is to be analyzed, receive one or more optical signals (e.g., fluorescence, backscattered radiation) from the at least one sample, and produce one or more electrical signals representative of the received optical signals. In some embodiments, the analytic system 1-160 can include one or more photodetectors and may also include signal-processing electronics (e.g., one or more microcontrollers, one or more field-programmable gate arrays, one or more microprocessors, one or more digital signal processors, logic gates, etc.) configured to process the electrical signals from the photodetectors. The analytic system 1-160 can also include data transmission hardware configured to transmit and receive data to and from external devices (e.g., one or more external devices on a network to which the instrument 1-100 can connect via one or more data communications links). In some embodiments, the analytic system 1-160 can be configured to receive an optoelectronic chip 1-140, which holds one or more samples to be analyzed.

Figures 1, 1B:
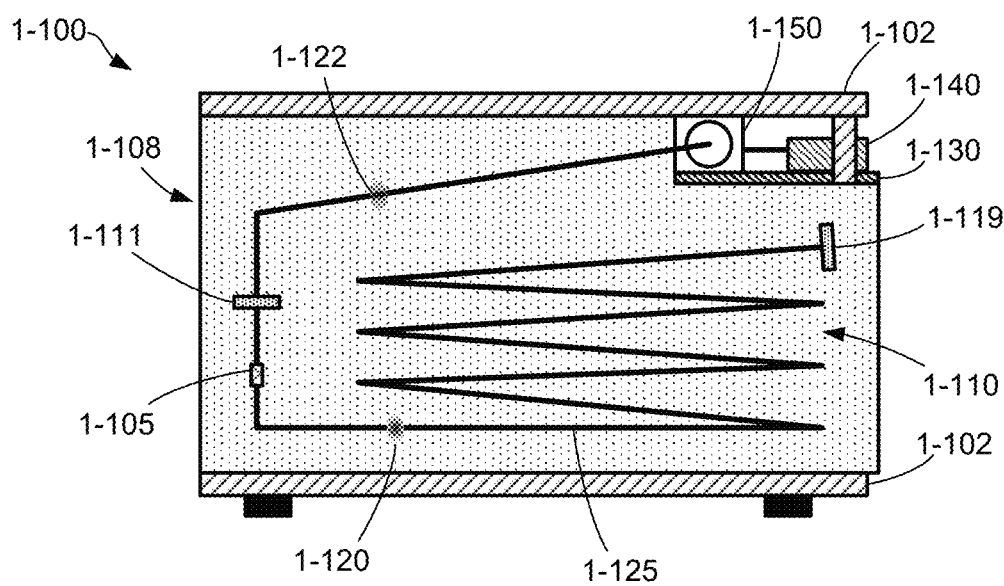

FIG. 1-1B depicts a further detailed example of a portable analytical instrument 1-100 that includes a compact pulsed optical source 1-108. In this example, the pulsed optical source 1-108 comprises a compact, passively mode-locked laser module 1-110. A passively mode-locked laser can produce optical pulses autonomously, without the application of an external pulsed signal. In some implementations, the module can be mounted to an instrument chassis or frame 1-102, and may be located inside an outer casing of the instrument. According to some embodiments, a pulsed optical source 1-108 can include additional components that can be used to operate the optical source and operate on an output beam from the optical source 1-108. A mode-locked laser 1-110 may comprise an element (e.g., saturable absorber, acousto-optic modulator, Kerr lens) in a laser cavity, or coupled to the laser cavity, that induces phase locking of the laser's longitudinal frequency modes. The laser cavity can be defined in part by cavity end mirrors 1-111, 1-119. Such locking of the frequency modes results in pulsed operation of the laser (e.g., an intracavity pulse 1-120 bounces back-and-forth between the cavity end mirrors) and produces a stream of output optical pulses 1-122 from one end mirror 1-111 which is partially transmitting.

In some cases, the analytic instrument 1-100 can be configured to receive a removable, packaged, optoelectronic chip 1-140. The chip can include a plurality of reaction chambers, integrated optical components arranged to deliver optical excitation energy to the reaction chambers, and integrated photodetectors arranged to detect fluorescent emission from the reaction chambers. In some implementations, the chip 1-140 can be disposable, whereas in other implementations the chip can be reusable. When the chip is received by the instrument, it can be in electrical and optical communication with the pulsed optical source and electrical and optical communication with the analytic system 1-160.

In some embodiments, the optoelectronic chip 1-140 can be mounted (e.g., via a socket connection) on an electronic circuit board 1-130, such as a printed circuit board (PCB) that can include additional instrument electronics. For example, the PCB 1-130 can include circuitry configured to provide electrical power, one or more clock signals, and control signals to the optoelectronic chip 1-140, and signal-processing circuitry arranged to receive signals representative of fluorescent emission detected from the reaction chambers. Data returned from the optoelectronic chip can be processed in part or entirely by electronics on the instrument 1-100, although data may be transmitted via a network connection to one or more remote data processors, in some implementations. The PCB 1-130 can also include circuitry configured to receive feedback signals from the chip relating to optical coupling and power levels of the optical pulses 1-122 coupled into waveguides of the optoelectronic chip 1-140. The feedback signals can be provided to one or both of the pulsed optical source 1-108 and optical system 1-115 to control one or more parameters of the output beam of optical pulses 1-122. In some cases, the PCB 1-130 can provide or route power to the pulsed optical source 1-108 for operating the optical source and related circuitry in the optical source 1-108.

According to some embodiments, the pulsed optical source 1-108 comprises a compact mode-locked laser module 1-110. The mode-locked laser can comprise a gain medium 1-105 (which can be solid-state material in some embodiments), an output coupler 1-111, and a laser-cavity end mirror 1-119. The mode-locked laser's optical cavity can be bound by the output coupler 1-111 and end mirror 1-119. An optical axis 1-125 of the laser cavity can have one or more folds (turns) to increase the length of the laser cavity. In some embodiments, there can be additional optical elements (not shown in FIG. 1-1B) in the laser cavity for beam shaping, wavelength selection, and/or pulse forming. In some cases, the end mirror 1-119 comprises a saturable-absorber mirror (SAM) that induces passive mode locking of longitudinal cavity modes and results in pulsed operation of the mode-locked laser. The pulse repetition rate is determined by the length of the laser cavity (e.g., the time for an optical pulse to make a round-trip within the laser cavity). The mode-locked laser module 1-110 can further include a pump source (e.g., a laser diode, not shown in FIG. 1-1B) for exciting the gain medium 1-105. Further details of a mode-locked laser module 1-110 can be found in U.S. patent application Ser. No. 15/844,469, titled "Compact Mode-Locked Laser Module," filed Dec. 15, 2017, which application is incorporated herein by reference.

When the laser 1-110 is mode locked, an intracavity pulse 1-120 can circulate between the end mirror 1-119 and the output coupler 1-111, and a portion of the intracavity pulse can be transmitted through the output coupler 1-111 as an output pulse 1-122. Accordingly, a train of output pulses 1-122, as depicted in the graph of FIG. 1-2, can be detected at the output coupler as the intracavity pulse 1-120 bounces back-and-forth between the output coupler 1-111 and end mirror 1-119 in the laser cavity.

Figures 1, 2:
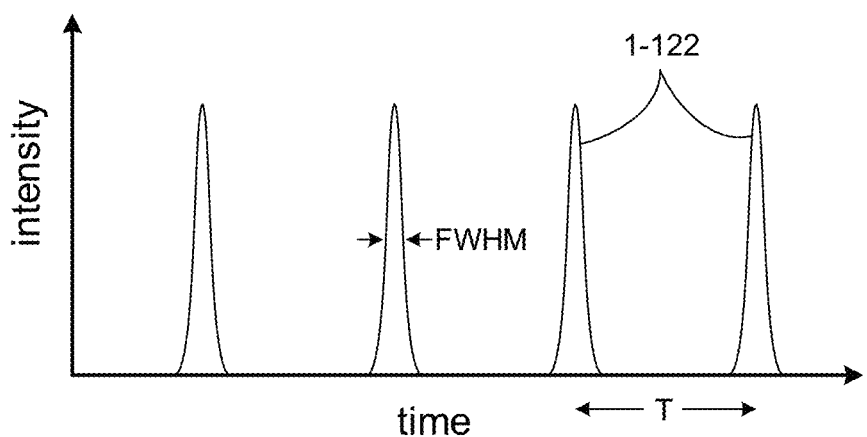

FIG. 1-2 depicts temporal intensity profiles of the output pulses 1-122. In some embodiments, the peak intensity values of the emitted pulses may be approximately equal, and the profiles may have a Gaussian temporal profile, though other profiles such as a $sech^2$ profile may be possible. In some cases, the pulses may not have symmetric temporal profiles and may have other temporal shapes. The duration of each pulse may be characterized by a full-width-half-maximum (FWHM) value, as indicated in FIG. 1-2. According to some embodiments of a mode-locked laser, ultrashort optical pulses can have FWHM values less than 100 picoseconds (ps). In some cases, the FWHM values can be between approximately 5 ps and approximately 30 ps.

The output pulses 1-122 can be separated by regular intervals T. For example, T can be determined by a round-trip travel time between the output coupler 1-111 and cavity end mirror 1-119. According to some embodiments, the pulse-separation interval T can be between about 1 ns and about 30 ns. In some cases, the pulse-separation interval T can be between about 5 ns and about 20 ns, corresponding to a laser-cavity length (an approximate length of the optical axis 1-125 within the laser cavity) between about 0.7 meter and about 3 meters. In embodiments, the pulse-separation interval corresponds to a round trip travel time in the laser cavity, so that a cavity length of 3 meters (round-trip distance of 6 meters) provides a pulse-separation interval T of approximately 20 ns.

According to some embodiments, a desired pulse-separation interval T and laser-cavity length can be determined by a combination of the number of reaction chambers on the chip 1-140, fluorescent emission characteristics, and the speed of data-handling circuitry for reading data from the optoelectronic chip 1-140. The inventors have recognized and appreciated that different fluorophores can be distinguished by their different fluorescent decay rates or characteristic lifetimes. Accordingly, there needs to be a sufficient pulse-separation interval T to collect adequate statistics for the selected fluorophores to distinguish between their different decay rates. Additionally, if the pulse-separation interval T is too short, the data handling circuitry cannot keep up with the large amount of data being collected by the large number of reaction chambers. The inventors have recognized and appreciated that a pulse-separation interval T between about 5 ns and about 20 ns is suitable for fluorophores that have decay rates up to about 2 ns and for handling data from between about 60,000 and 10,000,000 reaction chambers.

According to some implementations, a beam-steering module 1-150 can receive output pulses from the pulsed optical source 1-108 and be configured to adjust at least the position and incident angles of the optical pulses onto an optical coupler of the optoelectronic chip 1-140. In some cases, the output pulses 1-122 from the pulsed optical source 1-108 can be operated on by a beam-steering module 1-150 to additionally or alternatively change a beam shape and/or beam rotation at an optical coupler on the optoelectronic chip 1-140. In some implementations, the beam-steering module 1-150 can further provide focusing and/or polarization adjustments of the beam of output pulses onto the optical coupler. One example of a beam-steering module is described in U.S. patent application Ser. No. 15/161,088 titled "Pulsed Laser and Bioanalytic System," filed May 20, 2016, which is incorporated herein by reference. Another example of a beam-steering module is described in a separate U.S. patent application No. 62/435,679, filed Dec. 16, 2016 and titled "Compact Beam Shaping and Steering Assembly," which is incorporated herein by reference.

Figures 1, 2, 3:
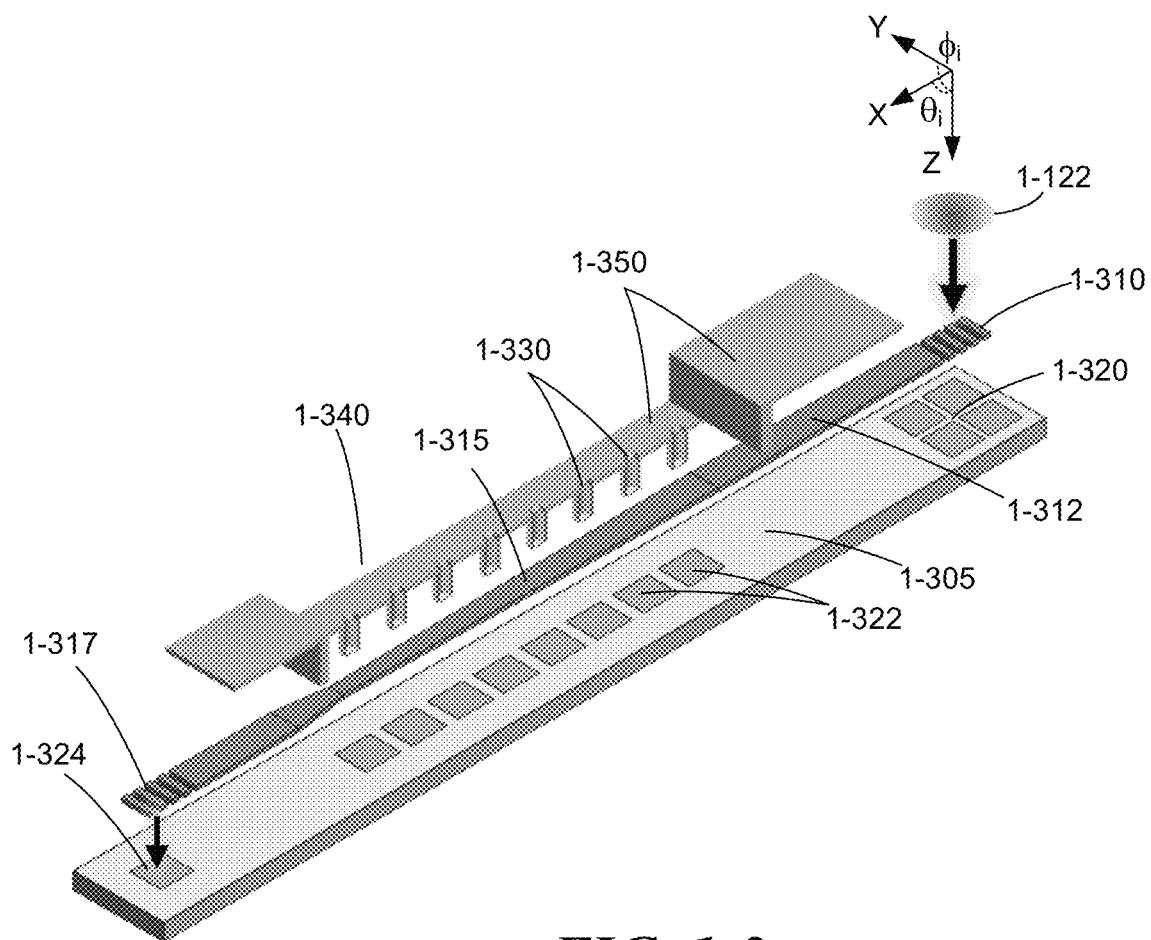

Referring to FIG. 1-3, the output pulses 1-122 from a pulsed optical source can be coupled into one or more optical waveguides 1-312 on the optoelectronic chip. In some embodiments, the optical pulses can be coupled to one or more waveguides via one or more grating couplers 1-310, though coupling to an end of one or more optical waveguides on the optoelectronic chip can be used in some embodiments. According to some embodiments, a quad detector 1-320 can be located on a semiconductor substrate 1-305 (e.g., a silicon substrate) for aiding in alignment of the beam of optical pulses 1-122 to a grating coupler 1-310. The one or more waveguides 1-312 and sample wells or reaction chambers 1-330 can be integrated on the same semiconductor substrate with intervening dielectric layers (e.g., silicon dioxide layers) between the substrate, waveguide, reaction chambers, and photodetectors 1-322.

A simplified illustration is shown in FIG. 1-3 in which a grating coupler 1-310 is arranged to couple incident pulses 1-122 of excitation radiation into a single waveguide 1-312. In an actual implementation, the grating coupler 1-310 can be more complex than the simplified structure shown and may span several waveguides, as described in U.S. patent application Ser. No. 15/842,720 filed on Dec. 14, 2017 and titled "Compact Beam Shaping and Steering Assembly" (e.g., as described in connection with FIG. 2-1A and FIG. 2-1B therein), which application is incorporated by reference herein in its entirety. In some implementations, portions of the grating coupler may be offset (e.g., in the x-direction in FIG. 1-3 herein or y-direction in FIG. 2-1A of the referenced application) with respect to other portions of the grating coupler to aid in maintaining alignment of the optical beam of pulses 1-122 on the grating coupler. Additionally or alternatively, portions of the grating coupler may have different grating periodicities with respect to other portions of the grating coupler to aid in maintaining alignment of the optical beam of pulses 1-122 on the grating coupler. Grating couplers with offset portions and/or portions having different grating periodicities are described further in a U.S. provisional patent application No. 62/861,832 co-filed with this application by the same Applicant on the same day, and titled "Sliced Grating Coupler with Increased Beam Alignment Sensitivity," which application is incorporated by reference herein in its entirety.

Each waveguide 1-312 can include a tapered portion 1-315 below the reaction chambers 1-330 to equalize optical power coupled to the reaction chambers along the waveguide. The reducing taper can force more optical energy outside the waveguide's core, increasing coupling to the reaction chambers and compensating for optical losses along the waveguide, including losses for light coupling into the reaction chambers. A second grating coupler 1-317 can be located at an end of each waveguide to direct optical energy to an integrated photodiode 1-324. The integrated photodiode can detect an amount of power coupled down a waveguide and provide a detected signal to feedback circuitry that controls the beam-steering module 1-150, for example.

The sample wells 1-330 or reaction chambers 1-330 can be aligned with the tapered portion 1-315 of the waveguide and recessed in a tub 1-340. There can be time-binning photodetectors 1-322 located on the semiconductor substrate 1-305 for each reaction chamber 1-330. A metal coating and/or multilayer coating 1-350 can be formed around the reaction chambers and above the waveguide to prevent optical excitation of fluorophores that are not in the reaction chambers (e.g., dispersed in a solution above the reaction chambers). The metal coating and/or multilayer coating 1-350 may be raised beyond edges of the tub 1-340 to reduce absorptive losses of the optical energy in the waveguide 1-312 at the input and output ends of each waveguide.

There can be a plurality of rows of waveguides, reaction chambers, and time-binning photodetectors on the optoelectronic chip 1-140. For example, there can be 128 rows, each having 512 reaction chambers, for a total of 65,536 reaction chambers in some implementations. Other implementations may include fewer or more reaction chambers, and may include other layout configurations. Optical power from the pulsed optical source 1-108 can be distributed to the multiple waveguides via one or more star couplers or multi-mode interference couplers, or by any other means, located between an optical coupler 1-310 to the chip 1-140 and the plurality of waveguides 1-312.

FIG. 1-4 illustrates optical energy coupling from an optical pulse 1-122 within a tapered portion of waveguide 1-315 to a reaction chamber 1-330. The drawing has been produced from an electromagnetic field simulation of the optical wave that accounts for waveguide dimensions, reaction chamber dimensions, the different materials' optical properties, and the distance of the tapered portion of waveguide 1-315 from the reaction chamber 1-330. The waveguide can be formed from silicon nitride in a surrounding medium 1-410 of silicon dioxide, for example. The waveguide, surrounding medium, and reaction chamber can be formed by microfabrication processes described in U.S. application Ser. No. 14/821,688, filed Aug. 7, 2015, titled "Integrated Device for Probing, Detecting and Analyzing Molecules." According to some embodiments, an evanescent optical field 1-420 couples optical energy transported by the waveguide to the reaction chamber 1-330.

A non-limiting example of a biological reaction taking place in a reaction chamber 1-330 is depicted in FIG. 1-5. The example depicts sequential incorporation of nucleotides or nucleotide analogs into a growing strand that is complementary to a target nucleic acid. The sequential incorporation can take place in a reaction chamber 1-330, and can be detected by an advanced analytic instrument to sequence DNA. The reaction chamber can have a depth between about 150 nm and about 250 nm and a diameter between about 80 nm and about 160 nm. A metallization layer 1-540 (e.g., a metallization for an electrical reference potential) can be patterned above a photodetector 1-322 to provide an aperture that blocks stray light from adjacent reaction chambers and other unwanted light sources. According to some embodiments, polymerase 1-520 can be located within the reaction chamber 1-330 (e.g., attached to a base of the chamber). The polymerase can take up a target nucleic acid 1-510 (e.g., a portion of nucleic acid derived from DNA), and sequence a growing strand of complementary nucleic acid to produce a growing strand of DNA 1-512. Nucleotides or nucleotide analogs labeled with different fluorophores can be dispersed in a solution above and within the reaction chamber.

When a labeled nucleotide or nucleotide analog 1-610 is incorporated into a growing strand of complementary nucleic acid, as depicted in FIG. 1-6, one or more attached fluorophores 1-630 can be repeatedly excited by pulses of optical energy coupled into the reaction chamber 1-330 from the waveguide 1-315. In some embodiments, the fluorophore or fluorophores 1-630 can be attached to one or more nucleotides or nucleotide analogs 1-610 with any suitable linker 1-620. An incorporation event may last for a period of time up to about 100 ms. During this time, pulses of fluorescent emission resulting from excitation of the fluorophore(s) by pulses from the mode-locked laser can be detected with a time-binning photodetector 1-322, for example. In some embodiments, there can be one or more additional integrated electronic devices 1-323 at each pixel for signal handling (e.g., amplification, read-out, routing, signal preprocessing, etc.). According to some embodiments, each pixel can include a single or multilayer optical filter 1-530 that passes fluorescent emission and reduces transmission of radiation from the excitation pulse. Some implementations may not use the optical filter 1-530. By attaching fluorophores with different emission characteristics (e.g., fluorescent decay rates, intensity, fluorescent wavelength) to the different nucleotides (A,C,G,T), detecting and distinguishing the different emission characteristics while the strand of DNA 1-512 incorporates a nucleic acid and enables determination of the genetic sequence of the growing strand of DNA.

According to some embodiments, an advanced analytic instrument 1-100 that is configured to analyze samples based on fluorescent emission characteristics can detect differences in fluorescent lifetimes and/or intensities between different fluorescent molecules, and/or differences between lifetimes and/or intensities of the same fluorescent molecules in different environments. By way of explanation, FIG. 1-7 plots two different fluorescent emission probability curves (A and B), which can be representative of fluorescent emission from two different fluorescent molecules, for example. With reference to curve A (dashed line), after being excited by a short or ultrashort optical pulse, a probability $p_A(t)$ of a fluorescent emission from a first molecule may decay with time, as depicted. In some cases, the decrease in the probability of a photon being emitted over time can be represented by an exponential decay function $p_A(t)=P_{Ao}e^{-t/\tau_1}$, where $P_{Ao}$ is an initial emission probability and $\tau_1$ is a temporal parameter associated with the first fluorescent molecule that characterizes the emission decay probability. $\tau_1$ may be referred to as the "fluorescence lifetime," "emission lifetime," or "lifetime" of the first fluorescent molecule. In some cases, the value of $\tau_1$ can be altered by a local environment of the fluorescent molecule. Other fluorescent molecules can have different emission characteristics than that shown in curve A. For example, another fluorescent molecule can have a decay profile that differs from a single exponential decay, and its lifetime can be characterized by a half-life value or some other metric.

A second fluorescent molecule may have a decay profile $p_B(t)$ that is exponential, but has a measurably different lifetime $\tau_2$, as depicted for curve B in FIG. 1-7. In the example shown, the lifetime for the second fluorescent molecule of curve B is shorter than the lifetime for curve A, and the probability of emission $p_B(t)$ is higher sooner after excitation of the second molecule than for curve A. Different fluorescent molecules can have lifetimes or half-life values ranging from about 0.1 ns to about 20 ns, in some embodiments.

The inventors have recognized and appreciated that differences in fluorescent emission lifetimes can be used to discern between the presence or absence of different fluorescent molecules and/or to discern between different environments or conditions to which a fluorescent molecule is subjected. In some cases, discerning fluorescent molecules based on lifetime (rather than emission wavelength, for example) can simplify aspects of an analytical instrument 1-100. As an example, wavelength-discriminating optics (such as wavelength filters, dedicated detectors for each wavelength, dedicated pulsed optical sources at different wavelengths, and/or diffractive optics) can be reduced in number or eliminated when discerning fluorescent molecules based on lifetime. In some cases, a single pulsed optical source operating at a single characteristic wavelength can be used to excite different fluorescent molecules that emit within a same wavelength region of the optical spectrum but have measurably different lifetimes. An analytic system that uses a single pulsed optical source, rather than multiple sources operating at different wavelengths, to excite and discern different fluorescent molecules emitting in a same wavelength region can be less complex to operate and maintain, more compact, and can be manufactured at lower cost.

Although analytic systems based on fluorescent lifetime analysis can have certain benefits, the amount of information obtained by an analytic system and/or detection accuracy can be increased by allowing for additional detection techniques. For example, some analytic systems 1-160 can additionally be configured to discern one or more properties of a sample based on fluorescent wavelength and/or fluorescent intensity.

Referring again to FIG. 1-7, according to some embodiments, different fluorescent lifetimes can be distinguished with a photodetector that is configured to time-bin fluorescent emission events following excitation of a fluorescent molecule. The time binning can occur during a single charge-accumulation cycle for the photodetector. A charge-accumulation cycle is an interval between read-out events during which photo-generated carriers are accumulated in bins of the time-binning photodetector. The concept of determining fluorescent lifetime by time-binning of emission events is introduced graphically in FIG. 1-8. At time $t_e$ just prior to $t_1$, a fluorescent molecule or ensemble of fluorescent molecules of a same type (e.g., the type corresponding to curve B of FIG. 1-7) is (are) excited by a short or ultrashort optical pulse. For a large ensemble of molecules, the intensity of emission can have a time profile similar to curve B, as depicted in FIG. 1-8.

For a single molecule or a small number of molecules, however, the emission of fluorescent photons occurs according to the statistics of curve B in FIG. 1-7, for this example. A time-binning photodetector 1-322 can accumulate carriers generated from emission events into discrete time bins. Three bins are indicated in FIG. 1-8, though fewer bins or more bins may be used in embodiments. The bins are temporally resolved with respect to the excitation time $t_e$ of the fluorescent molecule(s). For example, a first bin can accumulate carriers produced during an interval between times $t_1$ and $t_2$, occurring after the excitation event at time $t_e$. A second bin can accumulate carriers produced during an interval between times $t_2$ and $t_3$, and a third bin can accumulate carriers produced during an interval between times $t_3$ and $t_4$. When a large number of emission events are summed, carriers accumulated in the time bins can approximate the decaying intensity curve shown in FIG. 1-8, and the binned signals can be used to distinguish between different fluorescent molecules or different environments in which a fluorescent molecule is located.

Examples of a time-binning photodetector 1-322 are described in U.S. patent application Ser. No. 14/821,656, filed Aug. 7, 2015, titled "Integrated Device for Temporal Binning of Received Photons" and in U.S. patent application Ser. No. 15/852,571, filed Dec. 22, 2017, titled "Integrated Photodetector with Direct Binning Pixel," which are both incorporated herein by reference in their entirety. For explanation purposes, a non-limiting embodiment of a time-binning photodetector is depicted in FIG. 1-9. A single time-binning photodetector 1-322 can comprise a photon-absorption/carrier-generation region 1-902, a carrier-discharge channel 1-906, and a plurality of carrier-storage bins 1-908a, 1-908b all formed on a semiconductor substrate. Carrier-transport channels 1-907 can connect between the photon-absorption/carrier-generation region 1-902 and carrier-storage bins 1-908a, 1-908b. In the illustrated example, two carrier-storage bins are shown, but there may be more or fewer. There can be a read-out channel 1-910 connected to the carrier-storage bins. The photon-absorption/carrier-generation region 1-902, carrier-discharge channel 1-906, carrier-storage bins 1-908a, 1-908b, and read-out channel 1-910 can be formed by doping the semiconductor locally and/or forming adjacent insulating regions to provide photodetection capability, confinement, and transport of carriers. A time-binning photodetector 1-322 can also include a plurality of electrodes 1-920, 1-921, 1-922, 1-923, 1-924 formed on the substrate that are configured to generate electric fields in the device for transporting carriers through the device.

In operation, a portion of an excitation pulse 1-122 from a pulsed optical source 1-108 (e.g., a mode-locked laser) is delivered to a sample well 1-330 over the time-binning photodetector 1-322. Initially, some excitation radiation photons 1-901 may arrive at the photon-absorption/carrier-generation region 1-902 and produce carriers (shown as light-shaded circles). There can also be some fluorescent emission photons 1-903 that arrive with the excitation radiation photons 1-901 and produce corresponding carriers (shown as dark-shaded circles). Initially, the number of carriers produced by the excitation radiation can too large compared to the number of carriers produced by the fluorescent emission. The initial carriers produced during a time interval $|t_e-t_1|$ can be rejected by gating them into a carrier-discharge channel 1-906 with a first electrode 1-920, for example.

At a later times mostly fluorescent emission photons 1-903 arrive at the photon-absorption/carrier-generation region 1-902 and produce carriers (indicated a dark-shaded circles) that provide useful and detectable signal that is representative of fluorescent emission from the sample well 1-330. According to some detection methods, a second electrode 1-921 and third electrode 1-923 can be gated at a later time to direct carriers produced at a later time (e.g., during a second time interval $|t_1-t_2|$) to a first carrier-storage bin 1-908a. Subsequently, a fourth electrode 1-922 and fifth electrode 1-924 can be gated at a later time (e.g., during a third time interval $|t_2-t_3|$) to direct carriers to a second carrier-storage bin 1-908b. Charge accumulation can continue in this manner after excitation pulses for a large number of excitation pulses to accumulate an appreciable number of carriers and signal level in each carrier-storage bin 1-908a, 1-908b. At a later time, the signal can be read out from the bins. In some implementations, the time intervals corresponding to each storage bin are at the sub-nanosecond time scale, though longer time scales can be used in some embodiments (e.g., in embodiments where fluorophores have longer decay times).

The process of generating and time-binning carriers after an excitation event (e.g., excitation pulse from a pulsed optical source) can occur once after a single excitation pulse or be repeated multiple times after multiple excitation pulses during a single charge-accumulation cycle for the time-binning photodetector 1-322. After charge accumulation is complete, carriers can be read out of the storage bins via the read-out channel 1-910. For example, an appropriate biasing sequence can be applied to electrodes 1-923, 1-924 and at least to electrode 1-940 to remove carriers from the storage bins 1-908a, 1-908b. The charge accumulation and read-out processes can occur in a massively parallel operation on the optoelectronic chip 1-140 resulting in frames of data.

Although the described example in connection with FIG. 1-9 includes multiple charge storage bins 1-908a, 1-908b in some cases a single charge storage bin may be used instead. For example, only bin 1 may be present in a time-binning photodetector 1-322. In such a case, a single storage bins 1-908a can be operated in a variable time-gated manner to look at different time intervals after different excitation events. For example, after pulses in a first series of excitation pulses, electrodes for the storage bin 1-908a can be gated to collect carriers generated during a first time interval (e.g., during the second time interval $|t_1-t_2|$), and the accumulated signal can be read out after a first predetermined number of pulses. After pulses in a subsequent series of excitation pulses at the same sample well, the same electrodes for the storage bin 1-908a can be gated to collect carriers generated during a different interval (e.g., during the third time interval $|t_2-t_3|$), and the accumulated signal can be read out after a second predetermined number of pulses. Carriers could be collected during later time intervals in a similar manner if needed. In this manner, signal levels corresponding to fluorescent emission during different time periods after arrival of an excitation pulse at a sample well can be produced using a single carrier-storage bin.

Regardless of how charge accumulation is carried out for different time intervals after excitation, signals that are read out can provide a histogram having bins that are representative of the fluorescent emission decay characteristics, for example. An example process is illustrated in FIG. 1-10A and FIG. 1-10B. The histogram's bins can indicate a number of photons detected during each time interval after excitation of the fluorophore(s) in a sample well 1-330. In some embodiments, signals for the bins will be accumulated following a large number of excitation pulses, as depicted in FIG. 1-10A. The excitation pulses can occur at times $t_{e1}$, $t_{e2}$, $t_{e3}$, ... $t_{eN}$ which are separated by the pulse interval time T. In some cases, there can be between $10^5$ and $10^7$ excitation pulses 1-122 (or portions thereof) applied to a sample well during an accumulation of signals in the electron-storage bins for a single event being observed in the sample well (e.g., a single nucleotide incorporation event in DNA analysis). In some embodiments, one bin (bin 0) can be configured to detect an amplitude of excitation energy delivered with each optical pulse, and may be used as a reference signal (e.g., to normalize data). In other cases, the excitation pulse amplitude may be stable, determined one or more times during signal acquisition, and not determined after each excitation pulse so that there is no bin 0 signal acquisition after each excitation pulse. In such cases, carriers produced by an excitation pulse can be rejected and dumped from the photon-absorption/carrier-generation region 1-902 as described above in connection with FIG. 1-9.

In some implementations, only a single photon may be emitted from a fluorophore following an excitation event, as depicted in FIG. 1-10A. After a first excitation event at time $t_{e1}$, the emitted photon at time $t_{f1}$ may occur within a first time interval (e.g., between times $t_1$ and $t_2$), so that the resulting electron signal is accumulated in the first electron-storage bin (contributes to bin 1). In a subsequent excitation event at time $t_{e2}$, the emitted photon at time $t_{f2}$ may occur within a second time interval (e.g., between times $t_2$ and $t_3$), so that the resulting electron signal contributes to bin 2. After a next excitation event at time $t_{e3}$, a photon may emit at a time $t_{f3}$ occurring within the first time interval.

In some implementations, there may not be a fluorescent photon emitted and/or detected after each excitation pulse received at a sample well 1-330. In some cases, there can be as few as one fluorescent photon that is detected at a sample well for every 10,000 excitation pulses delivered to the sample well. One advantage of implementing a mode-locked laser 1-110 as the pulsed excitation source 1-108 is that a mode-locked laser can produce short optical pulses having high intensity and quick turn-off times at high pulse-repetition rates (e.g., between 50 MHz and 250 MHz). With such high pulse-repetition rates, the number of excitation pulses within a 10 millisecond charge-accumulation interval can be 50,000 to 250,000, so that detectable signal can be accumulated.

After a large number of excitation events and carrier accumulations, the carrier-storage bins of the time-binning photodetector 1-322 can be read out to provide a multi-valued signal (e.g., a histogram of two or more values, an N-dimensional vector, etc.) for a sample well. The signal values for each bin can depend upon the decay rate of the fluorophore. For example and referring again to FIG. 1-8, a fluorophore having a decay curve B will have a higher ratio of signal in bin 1 to bin 2 than a fluorophore having a decay curve A. The values from the bins can be analyzed and compared against calibration values, and/or each other, to determine the particular fluorophore present. For a sequencing application, identifying the fluorophore can determine the nucleotide or nucleotide analog that is being incorporated into a growing strand of DNA, for example. For other applications, identifying the fluorophore can determine an identity of a molecule or specimen of interest, which may be linked to the fluorophore.

To further aid in understanding the signal analysis, the accumulated, multi-bin values can be plotted as a histogram, as depicted in FIG. 1-10B for example, or can be recorded as a vector or location in N-dimensional space. Calibration runs can be performed separately to acquire calibration values for the multi-valued signals (e.g., calibration histograms) for four different fluorophores linked to the four nucleotides or nucleotide analogs. As an example, the calibration histograms may appear as depicted in FIG. 1-11A (fluorescent label associated with the T nucleotide), FIG. 1-11B (fluorescent label associated with the A nucleotide), FIG. 1-11C (fluorescent label associated with the C nucleotide), and FIG. 1-11D (fluorescent label associated with the G nucleotide). A comparison of the measured multi-valued signal (corresponding to the histogram of FIG. 1-10B) to the calibration multi-valued signals can determine the identity "T" (FIG. 1-11A) of the nucleotide or nucleotide analog being incorporated into the growing strand of DNA.

In some implementations, fluorescent intensity can be used additionally or alternatively to distinguish between different fluorophores. For example, some fluorophores may emit at significantly different intensities or have a significant difference in their probabilities of excitation (e.g., at least a difference of about 35%) even though their decay rates may be similar. By referencing binned signals (bins 1-3) to measured excitation energy and/or other acquired signals, it can be possible to distinguish different fluorophores based on intensity levels.

In some embodiments, different numbers of fluorophores of the same type can be linked to different nucleotides or nucleotide analogs, so that the nucleotides can be identified based on fluorophore intensity. For example, two fluorophores can be linked to a first nucleotide (e.g., "C") or nucleotide analog and four or more fluorophores can be linked to a second nucleotide (e.g., "T") or nucleotide analog. Because of the different numbers of fluorophores, there may be different excitation and fluorophore emission probabilities associated with the different nucleotides. For example, there may be more emission events for the "T" nucleotide or nucleotide analog during a signal accumulation interval, so that the apparent intensity of the bins is significantly higher than for the "C" nucleotide or nucleotide analog.

The inventors have recognized and appreciated that distinguishing nucleotides or any other biological or chemical specimens based on fluorophore decay rates and/or fluorophore intensities enables a simplification of the optical excitation and detection systems in an analytical instrument 1-100. For example, optical excitation can be performed with a single-wavelength source (e.g., a source producing one characteristic wavelength rather than multiple sources or a source operating at multiple different characteristic wavelengths). Additionally, wavelength discriminating optics and filters may not be needed in the detection system to distinguish between fluorophores of different wavelengths. Also, a single photodetector can be used for each reaction chamber to detect emission from different fluorophores.

The phrase "characteristic wavelength" or "wavelength" is used to refer to a central or predominant wavelength within a limited bandwidth of radiation (e.g., a central or peak wavelength within a 20 nm bandwidth output by a pulsed optical source). In some cases, "characteristic wavelength" or "wavelength" may be used to refer to a peak wavelength within a total bandwidth of radiation output by a source.

The inventors have recognized and appreciated that fluorophores having emission wavelengths in a range between about 560 nm and about 900 nm can provide adequate amounts of fluorescence to be detected by a time-binning photodetector (which can be fabricated on a silicon wafer using CMOS processes). These fluorophores can be linked to biological molecules of interest, such as nucleotides or nucleotide analogs for genetic sequencing applications. Fluorescent emission in this wavelength range can be detected with higher responsivity in a silicon-based photodetector than fluorescence at longer wavelengths. Additionally, fluorophores and associated linkers in this wavelength range may not interfere with incorporation of the nucleotides or nucleotide analogs into growing strands of DNA. The inventors have also recognized and appreciated that fluorophores having emission wavelengths in a range between about 560 nm and about 660 nm can be optically excited with a single-wavelength source. An example fluorophore in this range is Alexa Fluor 647, available from Thermo Fisher Scientific Inc. of Waltham, Massachusetts. The inventors have also recognized and appreciated that excitation energy at shorter wavelengths (e.g., between about 500 nm and about 650 nm) may be required to excite fluorophores that emit at wavelengths between about 560 nm and about 900 nm. In some embodiments, the time-binning photodetectors can efficiently detect longer-wavelength emission from the samples, e.g., by incorporating other materials, such as Ge, into the photodetectors active region.

Although the prospect of sequencing DNA using an excitation source that emits a single characteristic wavelength can simplify some of the optical system, it can place technically challenging demands on the excitation source and data acquisition. For example, the inventors have recognized and appreciated that optical pulses from the excitation source should extinguish quickly for the detection schemes described above, so that the excitation energy does not overwhelm or interfere with the subsequently detected fluorescent signals that may be used to distinguish fluorophores based on lifetime and/or intensity. The inventors have recognized and appreciated that mode-locked lasers can provide such rapid turn-off characteristics. However, mode-locked lasers can be difficult to operate in a stable mode-locking state for extended periods of time, which can adversely affect signal acquisition. For example, when distinguishing fluorophores based on time and/or intensity, stability of data acquisition timing and excitation pulse intensity are important to reduce misrecognition errors. Following extensive efforts, a compact and stable mode-locked laser was conceived and implemented as a replaceable module for an advanced analytic instrument 1-100. An example mode-locked laser module is described in U.S. patent application Ser. No. 15/844,469 referenced above. Such a laser has been found to provide a stable output of pulse intensity when operated continuously for hours. However, even with such a stable mode-locked laser, drift in the pulse repetition rate can occur as well as an occasional pulse drop-out (e.g., a missing pulse).

The importance of data acquisition timing can be understood with reference again to FIG. 1-10A. In order to properly accumulate fluorescent signals in bins, it is important that the timing intervals of the bins occur at a same time following each successive optical excitation pulse. If the timing of the bins drift with respect to the optical pulse, then carriers produced in the photodetector 1-322 by fluorescent signals may be accumulated into an incorrect bin and contribute to misrecognition of a fluorophore and a corresponding specimen. Additionally, it is desirable to read data from the optoelectronic chip 1-140 in approximate synchronicity with data acquisition at the reaction chambers to avoid data overruns and missed data.

One approach to controlling data acquisition timing is illustrated in FIG. 2-1. The inventors have recognized and appreciated that it is desirable to synchronize at least some electronic operations (e.g., data acquisition, signal processing, data transmission) of an analytic system 1-160 with the repetition rate of optical pulses 1-122 that are output from a mode-locked laser 1-110, for example. According to some embodiments, a timer 2-120 can be configured to detect optical pulses 1-120 or 1-122 produced by the mode-locked laser 1-110 and produce a timing signal (e.g., a clock signal) that can be synchronized with the sequence of optical pulses 1-122 and used to trigger instrument electronic operations. The inventors have recognized and appreciated that there are at least two important aspects associated with deriving a timing signal from a mode-locked laser or other pulsed optical source. A first aspect is to configure the instrument electronics so that, when using such a timing signal, the instrument will stably and continuously operate even though there may be intermittent interruptions in the production of optical pulses or drift in the frequency or repetition rate of the optical pulses. A second aspect is to configure the instrument electronics to time the occurrence of data acquisition bins on the optoelectronic chip (e.g., bin1, bin2, bin3, etc.) to collect high-quality signals that improve the performance of the instrument in distinguishing between different fluorophores.

In FIG. 2-1, optical pulses 1-122 are depicted as being separated spatially by a distance D. The illustration represents a snapshot in time. This separation distance corresponds to the time T between pulses according to the relation T=D/c where c is the speed of light. In practice, the time T between pulses can be measured with a photodiode and oscilloscope. For a mode-locked laser 1-110, the time T corresponds to a round-trip time of an optical pulse in the laser's cavity. According to some embodiments, $f_{sync}=1/(TN)$ where $f_{sync}$ represents the frequency of a clock signal generated from the detected train of optical pulses 1-122 and N is an integer greater than or equal to 1. In some implementations, a clock signal can be generated such that $f_{sync}=N/T$ where N is an integer greater than or equal to 1.

According to some embodiments, the timer 2-120 can receive an analog or digitized signal from a photodiode that detects optical pulses 1-122 from the mode-locked laser 1-110. The photodiode can be mounted in or near the mode-locked laser 1-110 or at a location in the analytic instrument 1-100 where it can detect light (scattered or transmitted) from the optical pulses 1-120 or 1-122. The timer 2-120 can use any suitable method to form or trigger a synchronizing signal from the received analog or digitized signal. For example, the timer can use a Schmitt trigger or comparator to form a train of digital pulses from detected optical pulses. In some implementations, the timer 2-120 can further use a delay-locked loop or phase-locked loop to synchronize a stable clock signal from a stable electronic clock source to a train of digital pulses produced from the detected optical pulses. The train of digital pulses and/or the locked stable clock signal can be provided to the analytic system 1-160 to synchronize electronics on the instrument 1-100 with the optical pulses.

In some embodiments, clock-detection circuitry is used to generate a clocking signal that can be used to drive data-acquisition electronics in a portable analytic instrument 1-100. An example of a clock-detection circuit 2-200 is depicted in FIG. 2-2, though the invention is not limited to the particular circuitry in the drawing. In some cases, the clock-detection circuit 2-200, or a portion thereof, can be assembled on a printed circuit board (PCB) that is part of a pulsed optical source 1-108, such as a mode-locked laser module 1-110. According to some embodiments, clock-detection circuit 2-200 can include stages of pulse detection, signal amplification with automatic gain control, clock digitization, and clock frequency/phase locking.

A pulse-detection stage 2-205 can comprise a high-speed photodiode 2-210 that is reversed biased and connected between a biasing potential and a reference potential (e.g., a ground potential), according to some embodiments. The photodiode 2-210 can be connected in series with two resistors $R_1$, $R_2$ to provide a desired amount of reverse bias, according to some implementations. A reverse bias on the photodiode can be any suitable value, and can be fixed using fixed-value resistors $R_1$, $R_2$ or can be adjustable. In some cases, a capacitor C can be connected between a cathode of the photodiode 2-210 and a reference potential to enhance the speed of the photodiode 2-210 and/or reduce signal noise. A signal from the anode of the photodiode can be provided to an amplification stage 2-207. In some embodiments, the pulse-detection stage 2-205 can be configured to detect optical pulses having an average power level between about 100 microwatts and about 25 milliwatts. The pulse-detection stage 2-205 of the clock-detection circuit 2-200 can be mounted on or near the mode-locked laser 1-110, and arranged to detect optical pulses 1-120 or 1-122 produced by the optical source (e.g., mode-locked laser 1-110).

An amplification stage 2-207 can comprise one or more analog amplifiers 2-220 that can include variable gain adjustments or adjustable attenuation, so that pulse output levels from the analog gain amplifiers can be set within a predetermined range. An amplification stage 2-207 of the clock-detection circuit 2-200 can further include an automatic gain control amplifier 2-240. In some cases, analog filtering circuitry 2-230 can be connected to an output of the analog amplifiers 2-220 (e.g., to remove high-frequency (e.g., greater than about 500 MHz) and/or low-frequency noise (e.g., less than about 100 Hz)). The filtered or unfiltered output from the one or more analog gain amplifiers 2-220 can be provided to an automatic gain control amplifier 2-240, according to some embodiments.

In some cases, a final output signal from the one or more analog amplifiers can be positive-going. The inventors have recognized and appreciated that a subsequent automatic gain-control (AGC) amplifier 2-240 operates more reliably when its input pulses peak to positive voltage rather than negative voltage. The automatic gain control amplifier 2-240 can vary its internal gain to compensate for amplitude fluctuations in the received electronic pulse train. The output pulse train from the automatic gain control amplifier 2-240 can have approximately constant amplitude, as depicted in FIG. 2-2, whereas the input to the automatic gain control amplifier 2-240 can have fluctuations in the pulse-to-pulse amplitudes. An example automatic gain control amplifier 2-240 is model AD8368 available from Analog Devices, Inc. of Norwood, Massachusetts.

In a clock digitization stage 2-209, an output from the automatic gain control amplifier 2-240 can be provided to a comparator 2-250 to produce a digital pulse train 2-252, according to some implementations. For example, the pulse train from the AGC amplifier can be provided to a first input of a comparator 2-250, and a reference potential (which can be user-settable in some embodiments) can be connected to a second input of the comparator 2-250. The reference potential can establish the trigger point for the rising edge of each produced digital pulse.

As may be appreciated, fluctuations in received optical pulse amplitudes would lead to fluctuations in amplitudes of the electronic pulses before the AGC amplifier 2-240. Without the AGC amplifier, these amplitude fluctuations would lead to timing jitter in the rising edges of pulses in the digitized pulse train from the comparator 2-250. By leveling the pulse amplitudes with the AGC amplifier 2-240, pulse jitter after the comparator 2-250 is reduced significantly. For example, timing jitter can be reduced to less than about 50 picoseconds with the AGC amplifier. In some implementations, an output from the comparator can be provided to logic circuitry 2-270 which is configured to change the duty cycle of the digitized pulse train to approximately 50%.

In some implementations, a frequency/phase-locking stage 2-211 of the clock-detection circuit 2-200 can comprise a phase-locked loop (PLL) that is used to produce at least one stable output clock signal CLK for timing and synchronizing instrument operations to the optical pulses 1-122. According to some embodiments, an output from the clock digitization stage 2-209 can be provided to a first input of a frequency/phase detector 2-280, and a signal from a stable electronic or electro-mechanical voltage controlled oscillator (VCO) 2-260 can be provided to a second input of the detector 2-280. An electronic or electro-mechanical oscillator can be highly stable against mechanical perturbations and against temperature variations. The PLL can further include a loop filter 2-282 arranged to filter an output from the frequency/phase detector 2-280 that is fed back to the VCO. In embodiments, the loop filter 2-282 can effectively integrate the detected difference signal from the frequency/phase detector 2-280 over a selected number of clock cycles.

According to some embodiments, a phase and frequency of the stable clock signal from the VCO 2-260 can be locked by the PLL to a phase and frequency of the digitized clock signal OS1 derived from optical pulses 1-122 of the pulsed optical source (e.g., mode-locked laser 1-110), which can be less stable. By using an integration period in the PLL that spans multiple optical pulses, the electronic or electromechanical oscillator 2-260 can lock to the frequency and phase of the optical pulse train and ride through short-term instabilities (e.g., pulse jitter, pulse drop outs) of the mode-locked laser 1-110. In this manner, the frequency/phase-locking stage 2-211 can produce one or more stable output clock signals CLK that are derived from a stable electro or electro-mechanical oscillator 2-260 and synchronized to the optical pulses 1-120 or 1-122 produced by the optical source 1-108. In some implementations, the output clock signal CLK can be provided to a clock synthesis stage that can divide the clock signal M ways and synthesize different clock signals from the M clock signals. An example circuit that can be used to implement the frequency/phase-locking stage 2-211 is IC chip Si5338, which is available from Silicon Laboratories Inc. of Austin, Texas.

The inventors have recognized and appreciated that, in some implementations, there can be an interplay between the loop bandwidth of the AGC amplifier 2-240 and the loop bandwidth of the PLL in the frequency/phase-locking stage 2-211. The loop bandwidth of the PLL is determined primarily by parameter values for the loop filter 2-282. For example, if the loop bandwidth of the PLL is too high, the output clock signal CLK can respond to jitter introduced or passed by the AGC amplifier and comparator in the digitized pulse train, and introduce excessive erratic behavior in the output clock signal CLK. The erratic behavior can lead to clocking errors and instrument lock-up. On the other hand, if either or both of the AGC and PLL loop bandwidths are too low, the resulting clock signals output from the PLL will not accurately track the optical pulse timing leading to signal detection errors on the optoelectronic chip 1-140 and unacceptably high misrecognitions an analyzed samples. The inventors have found that an integration time constant associated with the loop bandwidth of the PLL should be between approximately 30 pulses (±3 pulses) and approximately 80 pulses (±8 pulses) of the optical pulse train from the mode-locked laser 1-110. Additionally, an integration time constant associated with the loop bandwidth of the AGC amplifier 2-240 should not exceed by more than about 20% the integration time constant for the PLL.

FIG. 2-3 depicts one example of clock-generation circuitry 2-311, data-acquisition, and data-handling circuitry for an advanced analytic instrument 1-100 according to the present embodiments. Such example circuitry can include, but not be limited to, one or more clock generation circuits 2-381, 2-382, 2-383, one or more processors (such as a field-programmable gate array 2-320), memory 2-390, and a communication interface 2-340. According to some embodiments, each clock generation circuit 2-381, 2-382, 2-383 may include a phase-locked loop (PLL). In embodiments, multiple clock signals can be generated and used to time data acquisition, processing, and transmission of the data. The inventors have found that using multiple clock signals for data handling can provide more stable operation of an analytic instrument 1-100. According to some implementations, one or more clock signals (CLK3, CLK4, CLK6, CLK7 in the illustrated example) are derived from and/or synchronized to the pulsed optical source 1-108 or its sequence of optical pulses and can be used to drive data acquisition from the optoelectronic chip 1-140. Additionally, one or more clock signals (CLK1, CLK2, CLK5 in the illustrated example) may not be derived from the pulsed optical source 1-108 or its sequence of optical pulses, and can be derived from a stable oscillator 2-360 and can be used to drive data processing, data acquisition, communications, and data transmission. The inventors have recognized and appreciated that an advanced analytic instrument 1-100 can operate more stably and be tolerant of short term and long term disruptions in the pulsed optical source 1-108 when clock signals derived from a stable oscillator 2-360 are used separately from clock signals derived from the pulsed optical source to drive data processing, acquisition, and communication operations. The inclusion of a stable oscillator can prevent instrument lock-up due to erratic behavior of a clock signal derived from the pulsed optical source. For example, if a severe clocking error is detected (such as one or more optical pulse drop-outs in a sequence of optical pulses), the clock signal source for data acquisition and/or data processing can be switched to the stable oscillator to resume normal operation of the instrument 1-100.

According to some embodiments, output from a stable oscillator 2-360 can be divided with a 1:2 fan-out buffer 2-310 into two clocking signals OSC1, OSC2 of a same frequency and provided to two clock generation circuits 2-381, 2-382. In some cases, the clock generation circuits are programmable and each are capable of producing multiple output clock signals, at least some of which have frequencies different than the frequency of the received input signal OSC1, OSC2 at each clock generation circuit. There can also be at least one output signal of a same frequency as the received input signal from each clock generation circuit 2-381, 2-382. The output clock signals of same and different frequencies can be derived, at least in part, from a received input clock signal OSC1, OSC2. One example of a clock generation circuit 2-381 is chip model Si5338, which is available from Silicon Laboratories Inc. of Austin, Texas.

In a first clock generation circuit 2-381, an internal voltage-controlled oscillator (VCO) can be phase locked to a received stable oscillator signal OSC1 or to a periodic clocking signal OS1 derived from a train of optical pulses 1-120 or 1-122. The oscillator signal OSC1 can be produced by a stable electrical or electro-mechanical oscillator 2-360 (or any other suitable oscillator). In some embodiments, the clock generation circuit 2-381 can include circuitry for implementing a PLL to lock the frequency and phase of the internal VCO to either the signal OSC1 from oscillator 2-360 or to the clocking signal OS1 derived from the train of optical pulses. The circuitry for implementing a phase-locked loop can include a phase/frequency-difference detector, loop filter, and the VCO, for example. Selection of the input signal (e.g., OS1 or OSC1) for phase-locking can be performed via a control signal provided over an I²C communication link, for example. Selection of the input signal may depend upon stability or presence of the clocking signal OS1. For example, the signal OSC1 may be selected when the clocking signal OS1 is not present or unstable in amplitude, frequency, phase, or a combination thereof. In some implementations, the analytic instrument may be configured to automatically switch to and back from the oscillator-derived clock signal OSC1 when a disruption in the clocking signal OS1 is detected, so that the data acquisitions can ride through temporary disruptions in the sequence of optical pulses. The phase-locked loop can output a signal that is synchronized in frequency and/or phase to either a periodic clocking signal OS1 derived from a train of optical pulses 1-120 or 1-122 or to the stable oscillator signal OSC1.

According to some embodiments, the frequency of the signal OSC1 produced by the stable oscillator 2-360 can be significantly different from the periodic clocking signal OS1. For example, the frequency of the signal OSC1 can be on the order of 10 MHz and the frequency of the signal OS1 can be on the order of 65 MHz. In order to provide an output clock signal (e.g., CLK3) from the first clock generation circuit 2-381 that is essentially equal to a frequency $f_1$ of the clocking signal OS1 derived from the pulsed optical source 1-108 when the stable oscillator 2-360 is selected as an input signal source, the internal PLL and circuitry of the first clock generation circuit 2-381 can be configured to step the frequency up or down to a target value. In some cases, the frequency values can be set via a communication interface, e.g., an I²C interface. Accordingly, regardless of selection of the input signal source (whether OS1 or OSC1), the output clock frequencies can be maintained at an essentially same value. A clock signal (e.g., CLK3) output from the first clock generation circuit 2-381 may be provided to the optoelectronic chip 1-140 to time data acquisition operations at sample wells on the chip.

The inventors have recognized and appreciated that due to the complexities of the optoelectronic chip 1-140 and pulsed optical source 1-108 (e.g., mode-locked laser), there are periods of operation of the advanced analytic instrument 1-100 during which it can be preferable to perform operations with the optoelectronic chip 1-140 while the pulsed optical source 1-108 is in an off state or a warm-up state. During these periods, the input signal to the first clock generation circuit 2-381 can be provided from the stable oscillator 2-360. Subsequently, when the pulsed optical source 1-108 is operating and stable, the input signal to the first clock generation circuit 2-381 can be switched from the stable oscillator 2-360 to the periodic clocking signal OS1 derived from a train of optical pulses 1-120 or 1-122. In some operations, switching between signal OS1 and signal OSC1 can be performed as a part of automated instrument operation (e.g., checking electronics on the optoelectronic chip 1-140) prior to running an analysis of samples on the chip 1-140.

When a switch is made between input signals to the first clock generation circuit 2-381, there can be a brief disruption in clock signals output from the first clock generation circuit 2-381. Such a disruption can cause data transmission, data processing, and/or communication errors between the optoelectronic chip 1-140 and the FPGA 2-320 or other data processor. In embodiments, a clock signal (e.g., CLK3) derived from the first clock generation circuit 2-381 can be provided to the FPGA 2-320 or other data processor to compare with a clock signal derived from the stable oscillator 2-360 (e.g., CLK1 produced via a second clock generation circuit 2-382), so that the FPGA can detect disruptions in the clock signal(s) that are provided to the optoelectronic chip 1-140 and prevent errors in data transmission, data processing, data acquisition, and/or communication, as explained further below. For example, a clock signal (e.g., CLK3) derived from the first clock generation circuit 2-381 can be divided with a 1:2 fan-out buffer 2-310 and one of the output clock signals provided to the FPGA 2-320.

In some cases, the clock generation circuit 2-381 can include circuitry for outputting multiple clock signals CLK3, CLK4 that are produced from the PLL of the first clock generation circuit 2-381. The multiple clock signals can have same or different frequencies. Multiple clock signals of different frequencies can be produced by splitting an output signal from the PLL of the clock generation circuit 2-381 into multiple clock signals of a same frequency and providing one or more of the multiple clock signals to one or more clock dividers, which may be fractional (e.g., non-integer) or integer dividers. Different divider values can be used for each divider to produce multiple clock signals having different frequencies and output from the clock generation circuit 2-381.

In some cases, each clock signal CLK3, CLK4 output from the clock generation circuit 2-381 can have essentially a same frequency $f_1$. A clock generation circuit may include a programmable phase-adjust circuit that allows for fine and independent adjustment of each output clock's phase. According to some embodiments, programmability of phase, clock frequencies, and other aspects of clock generation (e.g., clock selection, clock amplitude, PLL loop bandwidth) can be performed via an I²C communication link or other data communication link. A data communication link may be established using a communication interface 2-340, such as a universal serial bus interface. Because there can be a large number of sample wells distributed across the optoelectronic chip 1-140, in some cases each clock signal CLK3, CLK4 can be provided to a different region of the chip to improve clock distribution and timing uniformity across the chip. For example, a clock signal provided to the chip 1-140 may be split into N clock signals of a same frequency and provided to N different spatial locations on the chip 1-140, where N is an integer.

According to some implementations, a first clock signal CLK3 from the first clock generation circuit 2-381 can be split with a 1:2 fan-out buffer 2-310 and provided to optoelectronic chip 1-140 and also to a data processor (e.g., field-programmable gate array (FPGA) 2-320) that processes data received from the optoelectronic chip 1-140. A second clock signal CLK4 can also be provided to the optoelectronic chip 1-140. In some implementations, the first clock signal CLK3 and/or second clock signal CLK4 can be used to drive data acquisition from sample wells 1-330 on the optoelectronic chip 1-140 and each may have essentially a same frequency $f_1$ as the train of optical pulses 1-122 that are incident on the optoelectronic chip 1-140. For example, the first clock signal CLK3 and/or second clock signal CLK4 can be used to trigger the timing of charge-accumulation intervals (e.g., gating of electrodes) for the time-binning photodetectors 1-322 on the optoelectronic chip 1-140, so that charge-accumulation intervals can be synchronized to the arrival frequency and/or time of optical pulses 1-122 at the sample wells 1-330.

In some implementations, the first clock signal CLK3 and/or second clock signal CLK4 can be provided to a clock-generation circuit 2-383 that produces two output clock signals CLK6, CLK7, which may be at one or two different frequencies of the first and second clock signals CLK3, CLK4. In some cases, one clock signal CLK6 can be used to time read-out of data from the array of time-binning photodetectors 1-322 (e.g., to drive row and column pointers for read-out of rows of data). The second clock signal CLK7 can be used to drive other functions performed by the optoelectronic chip 1-140. As an example, the second clock signal CLK7 can be used to drive charge accumulation at quad detectors 1-320 or photodiodes 1-324 on the optoelectronic chip 1-140 (e.g., photodetectors that can sense alignment of the optical pulses 1-122 to receiving optical structures on the optoelectronic chip 1-140). In embodiments, signals from quad detectors 1-320 and photodiodes 1-324 may not need to be collected as frequently as signals from the sample wells 1-330, so a lower data acquisition rate may be preferred to reduce an amount of data produced by the chip 1-140. In some implementations, a light level incident on the quad detectors 1-320 and photodiodes 1-324 can be reduced and longer integration times used when a slower clock frequency is used to drive data acquisition from these detectors and photodiodes, as compared to a higher clock frequency. Accordingly, a slower clock frequency for the second clock signal CLK7 can reduce an amount of optical power consumed by the quad detectors 1-320 and photodiodes 1-324, making more optical power available for excitation at the sample wells 1-330.

According to some embodiments, an analytic instrument 1-100 can use two clock signals derived from different sources and separately provided to a processor to validate data acquisitions for sample analysis (e.g., by determining that data arrives at a processor at an expected time for subsequent data processing). For example, a first clock signal CLK3 can be additionally provided to an FPGA 2-320 or other suitable data-processing device (e.g., microcontroller, microprocessor, digital-signal processor, etc.). The first clock signal CLK3 can indicate when new data is being transmitted to the FPGA 2-320, for example. The first clock signal CLK3 may not drive data-processing operations on the FPGA, and instead may be used to resolve timing or synchronization discrepancies that can occur between data acquisition on the optoelectronic chip 1-140 and data-processing operations on the FPGA 2-320. In some implementations, the frequency of the pulsed optical source 1-108 can drift over time leading to drifts in the periodic clocking signal OS1 derived from a train of optical pulses 1-120 or 1-122. This can lead to a drift in the frequency of the first clock signal $f_1$. When $f_1$ drifts, data acquisition at the chip 1-140 can sometimes drift out of synchronicity with data-processing operations on the FPGA 2-320 that may be driven by a second, different clock signal (e.g., clock signal CLK1). By providing the first clock signal CLK3 to the FPGA 2-320, the FPGA can determine when data-processing operations produce valid output for received data. In some implementations, data-processing operations may be suspended until the arrival of a rising or falling edge of the first clock signal CLK3, so as to synchronize data-processing operations with data acquisitions on the optoelectronic chip 1-140. In some cases, upon detecting a timing or synchronization discrepancy, the FPGA 2-320 or suitable data processor may alter timing of data-processing operations in order to resynchronize the data-processing operations with data received from the optoelectronic chip 1-140. For example, the FPGA 2-320 may drop (e.g., discard or overwrite) one or more lines or frame(s) of data received from the optoelectronic chip 1-140 in order to resynchronize data-processing operations with a data stream received from the chip 1-140. In some cases, data-processing operations may be paused by the FPGA 2-320 or suitable data processor to await arrival and synchronization with incoming data from the chip 1-140.

In some embodiments, a first data stream DATA1 can be transmitted from the optoelectronic chip 1-140 to the FPGA 2-320 based on the first clock signal CLK3 or a clock signal CLK6 derived from the first clock signal CLK3. For example, the first clock signal CLK3 may be used directly, or converted to a different frequency and used, to clock transmission of sample well data from the optoelectronic chip to the FPGA. The first data stream DATA1 can be derived from signals detected from the sample wells 1-330. In some cases, a second data stream DATA2 can be transmitted from the optoelectronic chip 1-140 to the FPGA 2-320 based on the second clock signal CLK7. For example, the second data stream DATA2 can be derived from signals detected from the quad detectors 1-320 and photodiodes 1-324.

A second clock-generation circuit 2-382 can produce additional clock signals CLK1, CLK2, CLK5 that are used by the analytic system 1-100. According to some embodiments, the second clock-generation circuit 2-382 can receive an input clock signal OSC2 that is produced by a stable oscillator 2-360. A phase-locked loop may or may not be used or implemented in the second clock-generation circuit 2-382. In some embodiments, the second clock-generation circuit 2-382 is used to generate multiple clock signals CLK1, CLK2, CLK5 of different desired frequencies. Since the clock signals output from the second clock-generation circuit 2-382 are derived only from a stable oscillator 2-360, these clock signals can run continuously without interruption and essentially without frequency drift (e.g., less than 200 parts per million) in contrast to the clock signals produced by the first clock generation circuit 2-381 that are derived from the pulsed optical source 1-108. Accordingly, clock signals output from the second clock-generation circuit 2-382 are suitable for driving data handling and communication operations continuously, thereby avoiding data-processing and data-communication errors or disruptions due to the pulsed optical source that might otherwise cause the data-acquisition and data-handling circuitry 2-300 to lock up or freeze.

In some embodiments, a first clock signal CLK1 from the second clock-generation circuit 2-382 can be used to drive data-processing operations in the FPGA 2-320. In some embodiments, the frequency $f_2$ of the first clock signal CLK1 can be higher than the frequency $f_1$ of the first clock signal CLK3 from the first clock-generation circuit 2-381 that is synchronized to the train of optical pulses 1-122. A second clock signal CLK2 at a same frequency $f_2$ (or different frequency in some cases) produced by the second clock-generation circuit 2-382 can be used to drive a data-communications interface 2-340, according to some embodiments. The data communications interface may be a USB interface through which I²C communications with the clock-generation circuits 2-381, 2-382 can be exchanged. The inventors have recognized and appreciated that it can be highly preferable to use a clock essentially free of interruptions to drive the USB interface so that communications with the clock-generation circuits 2-381, 2-382 can be maintained.

In some cases, a third clock signal CLK5 at a frequency $f_3$ produced by the second clock-generation circuit 2-382 can be provided to the FPGA 2-320 to drive data communications between the FPGA and one or more external devices. For example, the third clock signal CLK5 may be used to derive a data-transmission clock signal DCLK that drives transmission of processed data to and retrieval of data from a double data rate (DDR) memory device 2-390. The frequency $f_3$ of the third clock signal CLK5 may be less than, the same as, or greater than frequency $f_2$.

The inventors have recognized and appreciated that timing of data acquisition (e.g., timing of charge-accumulation intervals of the time-binning photodetectors 1-322 at the optoelectronic chip 1-140) is important for obtaining usable signals and improved results. According to some embodiments, the initiation of charge-accumulation intervals should begin at a preferred time after the arrival of excitation pulses at the sample wells 1-330. If the charge-accumulation intervals begin too soon, the relevant signals for distinguishing fluorophores may be overwhelmed by and lost in a background signal produced by the optical excitation pulse. If the charge-accumulation intervals begin too late, the relevant signals may be too weak and an amount of noise arriving with the signals can undesirably lead to an unacceptably high number of misrecognitions or signal-processing errors.

FIG. 3-1 illustrates an example of an excitation pulse 3-110 and timing relationship to a fluorophore's emission probability curve 3-120. Upon excitation of a fluorophore within a sample well 1-330, the peak of the emission probability curve 3-120 essentially occurs at the same time $t_e$ that a peak of an excitation pulse 3-110 arrives at the sample well. The emission probability curve 3-120 can be represented as a function of time $p_B(t-t_e)$ that decays with time from an initial value $P_{Bo}$ as depicted in the drawing. In embodiments, it is preferable to have the tail of the excitation pulse 3-110 extinguish at approximately, or slightly before, the beginning time $t_1$ of a charge accumulation window for a time-binning photodetector 1-322. For the illustrated embodiment in FIG. 3-1, the charge accumulation window extends from $t_1$ to $t_3$, and only two time bins ($|t_1-t_2|$, $|t_2-t_3|$) are used to distinguish fluorophores.

FIG. 3-2 is an example plot of excitation photon dynamics. The probability of detecting an excitation photon during each picosecond with a time-binning photodetector 1-322 is plotted, on a log scale, as a function of time. The curve provides information about pulse dynamics at a sample well during excitation of a fluorophore. The plot was obtained by measuring an optical pulse from a pulsed optical source with a fast photodiode, converting the measurement result into photon number per 1 picosecond time bins, and then normalizing the results to produce a probability of detection curve having an area that sums approximately to 1. In this plot, the peak of the pulse arrives at time $t_e \approx 200$ ps. The leading edge of the pulse (left side) rises quickly in time, and the tail of the pulse (decays more slowly). The plot provides an example of pulse shape, though other pulse shapes may be used. The plot can be converted and/or scaled for a particular application.

For an example optoelectronic chip 1-140, the inventors have determined that there can be approximately 500 photons of scattered excitation radiation delivered per pulse to each sample well 1-330. Accordingly, the curve in FIG. 3-2 can be scaled upward such that its area is equivalent to approximately 500 to represent the number of scattered photons arriving at a sample well per pulse. These photons are unwanted, since they can contribute to a background signal from the photodetector 1-322. Additionally, the curve in FIG. 3-2 can be scaled upward further by multiplying by the total number of pulses received during a frame integration period to represent the number of photons arriving at a sample well per frame of accumulated signal. The total number of excitation pulses received at a sample well during accumulation of a signal can be any number between 10 and 1,000,000. For purposes of signal detection, the curve in FIG. 3-2 can be corrected (e.g., scaled to account for changes in detector collection angle and quantum efficiency, to account for any optical filtering or attenuation of the excitation wavelength that may be added) to represent a probability of detection of an excitation photon as a function of time.

As described above, there can be 1 or 0 fluorescent photon emitted for each excitation pulse. Further, the inventors have observed that in some cases there can be as few as 1 fluorescent photon emitted and detected from a sample well for 10,000 excitation pulses delivered to the sample well. Accordingly for this example, to be able to detect the fluorescent photon (if emitted), one should set the leading edge (time $t_1$) of a first charge-accumulation interval at a point past the peak of the pulse where there is at most a probability of $10^{-4}$ (relative to the peak probability) that a photon will be present. In such a case and for a corrected probability of detecting an excitation photon like the trace shown in FIG. 3-2, the time $t_1$ should be set at about or more than 300 ps past the peak of the excitation pulse to provide a suitable rejection ratio of scattered photons from the excitation pulse. For other conditions (e.g., different waveguide scattering amounts, different pulse shape, different efficiency of fluorescent emission, etc.), the time $t_1$ may be set at a different time relative to the peak of the excitation pulse. As an example, a pulse shape may be different from the trace shown in FIG. 3-2 for a different type of pulsed optical source (such as a mode-locked laser), and may fall off more rapidly past a peak of the pulse.

In practice, the inventors have found that there are other factors that influence the location of the leading edge (time $t_1$) of a first charge-accumulation interval. FIG. 3-3 illustrates measured signal values (dark circles) obtained from a first charge-accumulation bin 1-908a of a time-binning photodetector 1-322. The signal values were obtained by delivering excitation pulses 1-122 to a "dry" optoelectronic chip 1-140 having no sample and sweeping the phase of the data-acquisition clock signals CLK3, CLK4. By sweeping the phase of the data-acquisition clock signals, the timing of the first charge-accumulation interval $|t_1-t_2|$ was swept in time with respect to the arrival time $t_e$ of the excitation pulse 1-122 at the sample well 1-330. When the first charge-accumulation interval $|t_1-t_2|$ straddled the arrival time $t_e$ of the excitation pulse, the signal level was at a maximum value forming the plateau portion 3-320 of the curve.

When the leading edge of the excitation pulse was approaching the trailing edge of the first charge-accumulation interval $|t_1-t_2|$, the measured signal levels formed a rising edge 3-310 on the curve 3-300. When the charge-accumulation interval $|t_1-t_2|$ moves past the peak and trailing edge of the excitation pulse, the measured signal levels formed a falling edge 3-330 on the curve 3-300. A shoulder 3-340 was also observed and is due to incomplete removal of carriers from the photon-absorption/carrier-generation region 1-902 and other noise sources.

In embodiments and referring to FIG. 3-1, the time $t_e$ of arrival of the excitation pulse at a sample well 1-330 and the initiation of the fluorophore's emission probability curve 3-120 are essentially locked together in time. The occurrence of the times $t_1$, $t_2$, $t_3$ can be swept (e.g., swept together as a unit) back and forth in relative time by adjusting a phase of data-acquisition clock signals (e.g., CLK3, CLK4) that are provided to the optoelectronic chip 1-140 and used to drive charge-accumulation cycles and signal read-out at the time-binning photodetectors 1-322. In some implementations, the clock signals CLK3, CLK4 can be delayed by phase delay circuitry implemented on the optoelectronic chip 1-140. The width of the time bins 3-131 ($t_2-t_1$), 3-132 ($t_3-t_2$), can be set independently by circuitry on the optoelectronic chip 1-140, according to some implementations. The width of the time bins can be based on fluorophore decay characteristics, for example. In some embodiments, the width of the time bins may be determined by numerical simulation based on the decay curves for different fluorophores used, so that the bin widths increase the probability of correctly distinguishing between the fluorophores. For example, the bin widths may be sized to provide a highest probability of correctly distinguishing between the fluorophores. According to some implementations, the duration of the second time bin 3-132 is greater than the duration of the first time bin 3-131.

According to some embodiments, a start time $t_1$ of a first charge-accumulation interval $|t_1-t_2|$ can be set a predetermined time (e.g., $t_{A1}$ at point A1) past a trailing edge (time $t_f$) of the plateau portion 3-320. The time $t_f$ corresponds to a time at which the peak of an excitation pulse (time $t_e$) approximately coincides with an end time $t_2$ of the first charge-accumulation window. In some cases, the time $t_{A1}$ may be determined according to photon detection probability as described in connection with FIG. 3-2. For example, the time $t_{A1}$ can be set to a value such that the probability of detecting one excitation photon $P_{1e}$ during all first charge-accumulation intervals $|t_1-t_2|$ for a frame of data is less than the probability of detecting one fluorescent emission photon $P_{1f}$ according to the following relation $$P_{1e} \geq \gamma \times P_{1f}$$

where γ may have a value between 1 and $10^{-2}$ in some cases, between $10^{-2}$ and $10^{-3}$ in some cases, and yet between $10^{-1}$ and $10^{-4}$ in some cases.

According to some embodiments, a start time $t_1$ of a first charge-accumulation interval $|t_1-t_2|$ can be set a predetermined time (e.g., $t_{A2}$ at point A2) prior to a leading edge (time $t_0$) of the plateau portion 3-320. The time $t_0$ corresponds to a time at which the peak of an excitation pulse (time $t_e$) approximately coincides with a start time $t_1$ of the charge-accumulation window. In some cases, the time $t_{A2}$ can be determined according to photon detection probability as described in connection with FIG. 3-2. For example, the time $t_{A2}$ can be set to a value such that the probability of detecting one excitation photon $P_{1e}$ during all second charge-accumulation intervals $|t_2-t_3|$ or final charge-accumulation intervals for a frame of data is less than the probability of detecting one fluorescent emission photon $P_{1f}$ according to the following relation $$P_{1e} \geq \gamma \times P_{1f}$$

where γ has a value between 1 and $10^{-2}$ in some cases, between $10^{-2}$ and $10^{-3}$ in some cases, and yet between $10^{-3}$ and $10^{-4}$ in some cases.

In some implementations, a noise characteristic of the time-binning photodetector 1-322 may exhibit a minimum value at a time (point B) between arrivals of consecutive excitation pulses. Accordingly, a predetermined time $t_B$ may be determined by sweeping the phase of the data-acquisition clock signals CLK3, CLK4 and identifying a delay value (point B), or phase point of the resulting curve 3-300, at which a minimum in the amplitude of signal levels is received during the first charge-accumulation interval. The minimum signal level (point B) may be referenced, for example, to a falling edge $t_f$ of a plateau portion 3-320 (e.g., time delay $t_B$ from $t_f$) or to a leading edge of the plateau portion 3-320 (time $t_0$). Regardless of how the time $t_{A1}$, $t_{A2}$, or $t_B$ is determined, the start time of a first charge-accumulation interval can be set for data acquisition by sweeping the phase of the data-acquisition clock signals CLK3, CLK4, identifying one or more reference points in the resulting curve 3-300, and then delaying the start time of the first charge-accumulation interval from a reference point by the selected time $t_{A1}$, $t_{A2}$, or $t_B$. Examples of reference points include an inflection point (such as inflection points $t_0$ and $t_f$ above), peaks, minimums, and fractional signal levels between a reference point and peak value (e.g., ½ the height on a rising or falling edge from a minimum value).

Other methods for setting the start time $t_1$ of the first charge-accumulation interval can be used. Referring again to FIG. 3-1, in some embodiments, the start time $t_1$ can be set such that an amount of excitation radiation detected by one or more bins 3-131, 3-132 is no greater than a first predetermined threshold value and no less than a second predetermined value. For example, it may be beneficial to detect a target amount of excitation radiation in order to detect a sufficient amount of emission radiation from a sample well. According to some embodiments, the second predetermined threshold value may be no less than 70% of the first predetermined threshold value. In some cases, the first and second predetermined threshold values may be absolute signal levels (e.g., expressed in millivolts) determined for a chip 1-140 from many measurements made with samples in the sample wells of identical chips. The threshold values may be provided with chip information or may be coded onto the chip for retrieval during an automated chip-calibration procedure. Additionally or alternatively in some cases, the start time $t_1$ of the first charge-accumulation interval can be set such that a ratio of signal detected by the first bin to signal detected by the second bin is greater than a predetermined threshold value.

The inventors have found that there can be slight timing variations between optoelectronic chips 1-140 when chips are interchanged in the analytic instrument 1-100. Even though the timing may be correct for a first chip 1-140, the timing can be incorrect for a subsequent chip. Accordingly, a calibration procedure for each chip can be implemented to obtain a correct timing of the charge accumulation windows.

According to some embodiments, a calibration procedure can be executed for each optoelectronic chip 1-140 before the chip is loaded with a sample. Such a chip may be referred to as a "dry chip." A calibration procedure may be executed by placing a dry chip in the advanced analytic instrument 1-100 prior to loading the chip with a sample, and executing an automated chip-calibration procedure. During chip calibration, the start time of the first charge-accumulation interval can be set as described above.

During the chip-calibration procedure, in addition to setting timing for charge-accumulation windows, optical coupling of excitation radiation to the sample wells 1-330 and operation of time-binning photodetectors 1-322 can be evaluated (e.g., to determine which sample wells 1-330 are viable for subsequent measurements). For example, an amount of signal detected from each sample well due to the optical excitation pulses 1-122 can be compared to a chip average level. The comparison can be used to identify sample wells that are not operating or exhibiting unacceptable performance. Sample wells with unacceptable performance or not operating can be flagged by the FPGA 2-320 and data from these sample wells can be excluded from final analysis results.

Figures 1, 2, 3, 4:
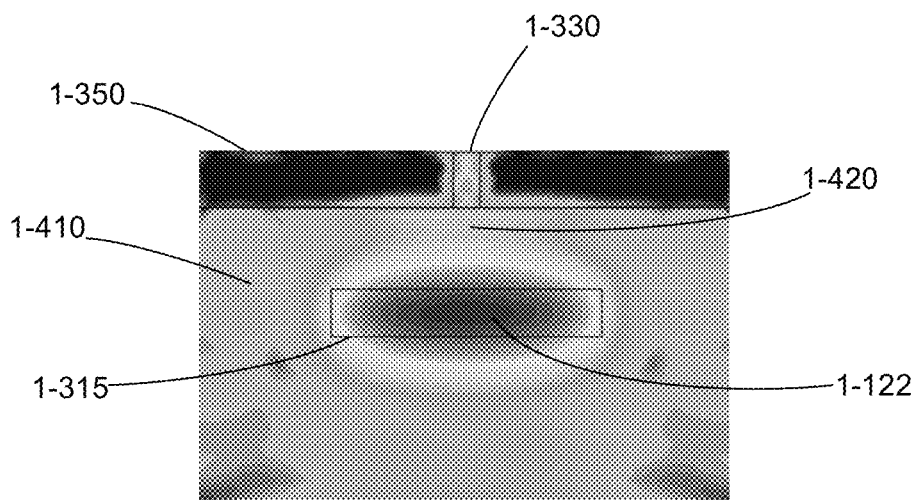
Figures 1, 2, 3, 4, 5:
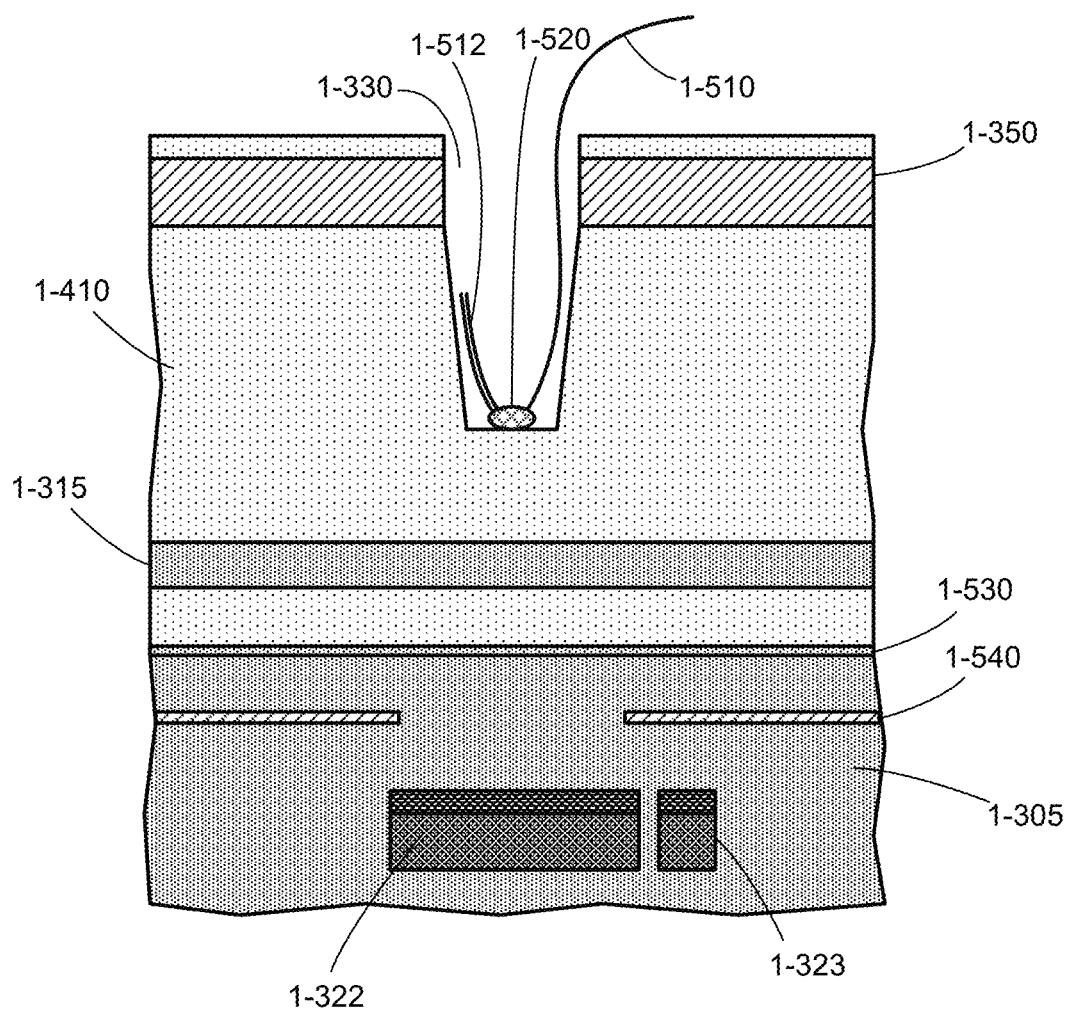
Figures 1, 2, 3, 4, 5, 6:
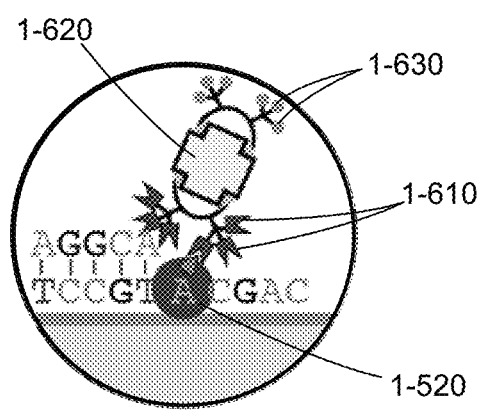
Figures 1, 2, 3, 4, 5, 6, 7:
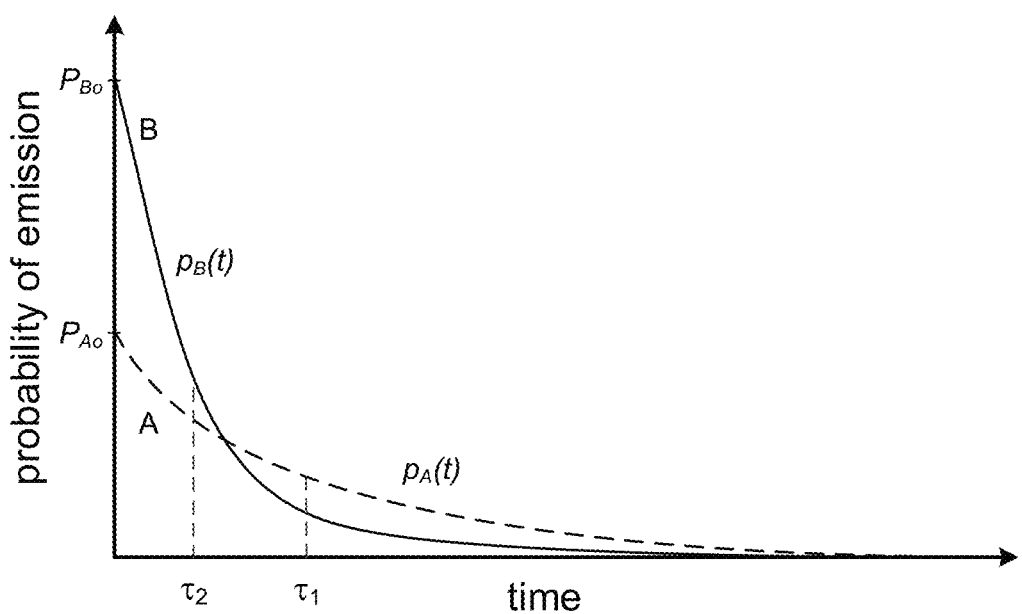
Figures 1, 2, 3, 4, 5, 6, 7, 8:
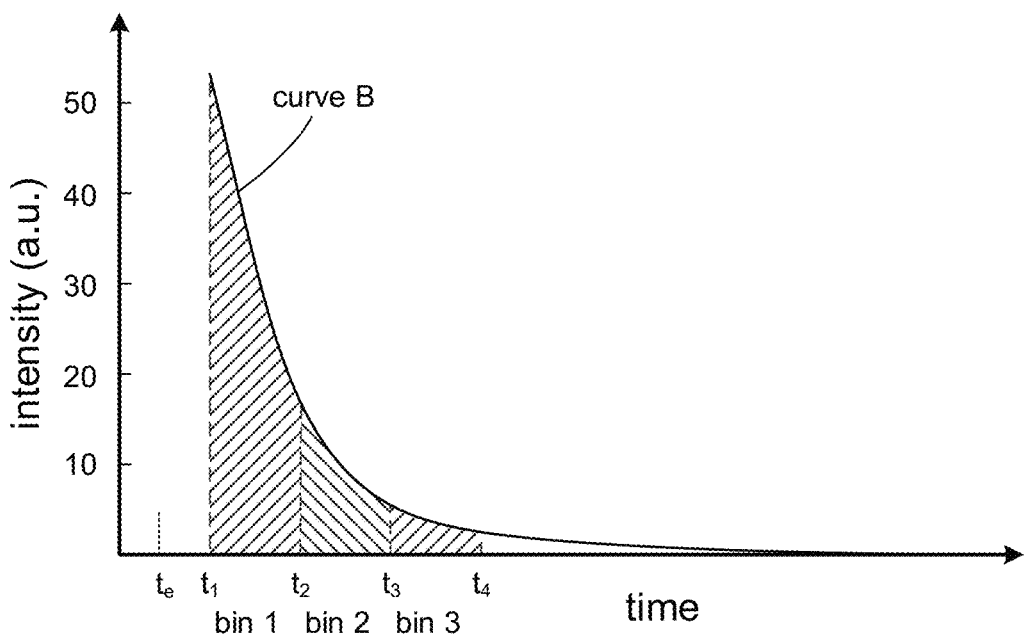
Figures 1, 2, 3, 4, 5, 6, 7, 8, 9:
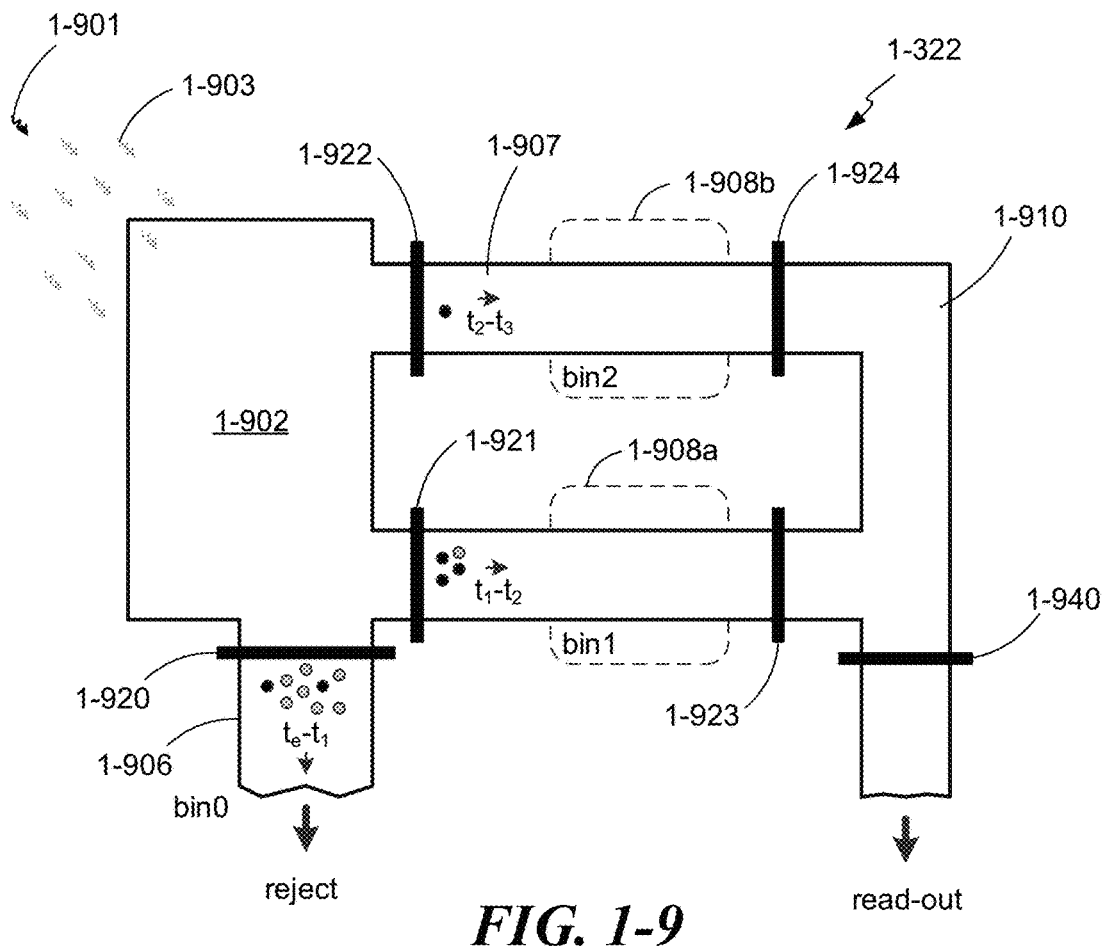
Figures 1, 2, 3, 4, 5, 6, 7, 8, 9, 10, 10A:
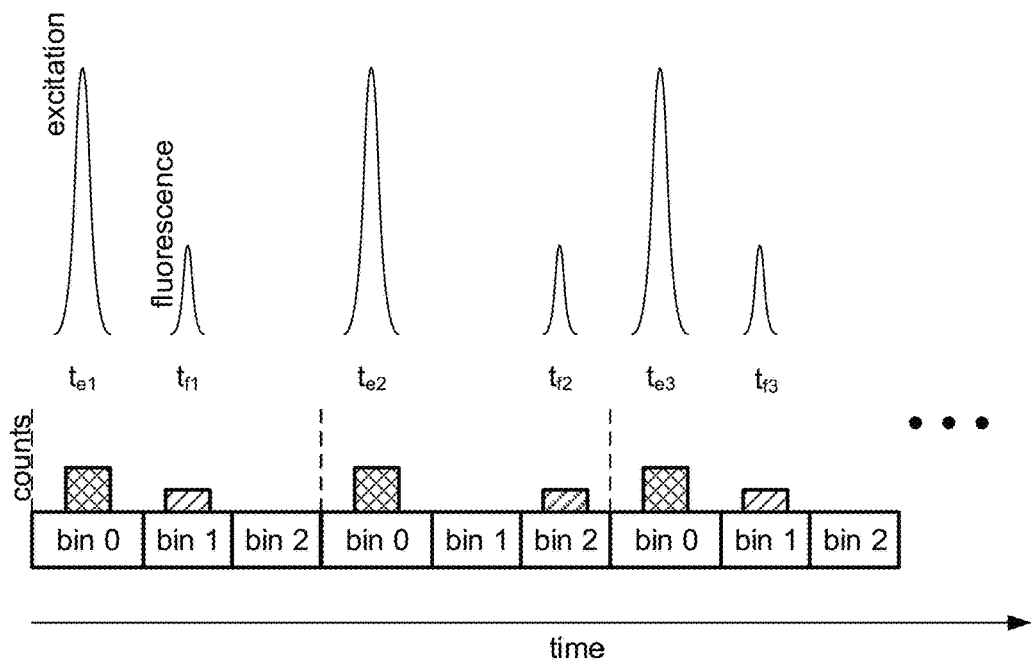
Figures 1, 2, 3, 4, 5, 6, 7, 8, 9, 10, 10B:
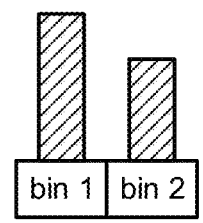
Figures 1, 2, 3, 4, 5, 6, 7, 8, 9, 10, 11, 11A:
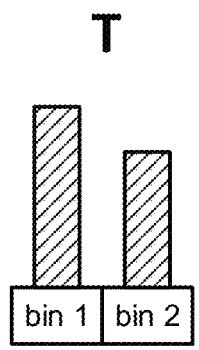
Figures 1, 2, 3, 4, 5, 6, 7, 8, 9, 10, 11, 11B:
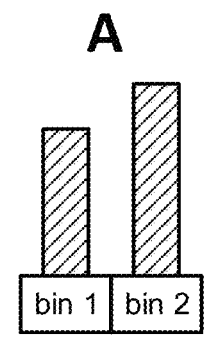
Figures 1, 2, 3, 4, 5, 6, 7, 8, 9, 10, 11, 11C:
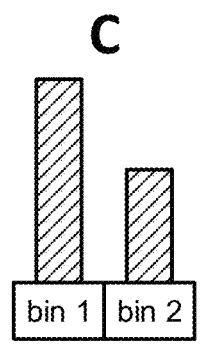
Figures 1, 2, 3, 4, 5, 6, 7, 8, 9, 10, 11, 11D:
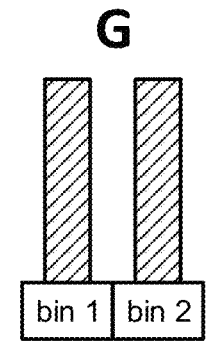
Figures 1, 2:
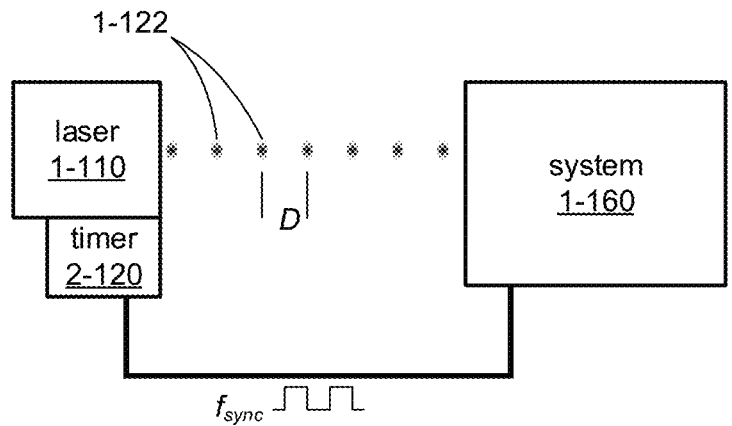
Figures 1, 3:
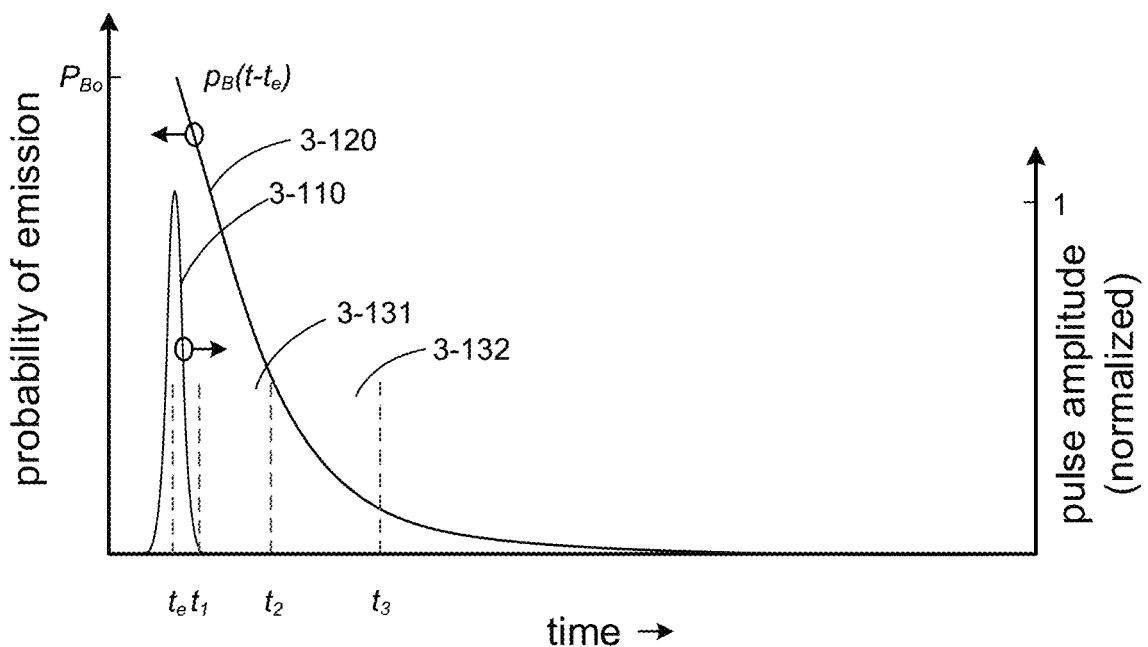
Figure 2:
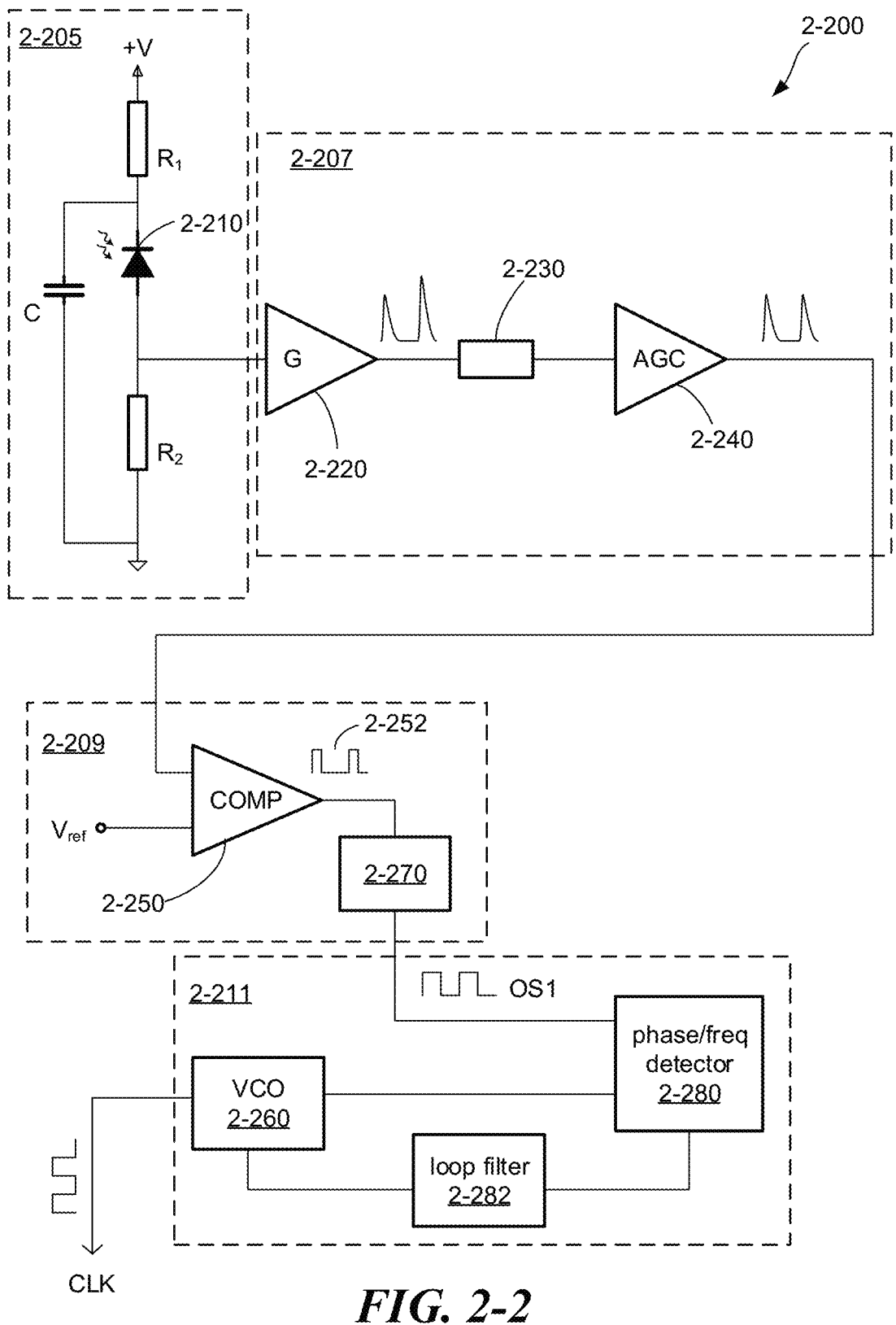
Figures 2, 3:
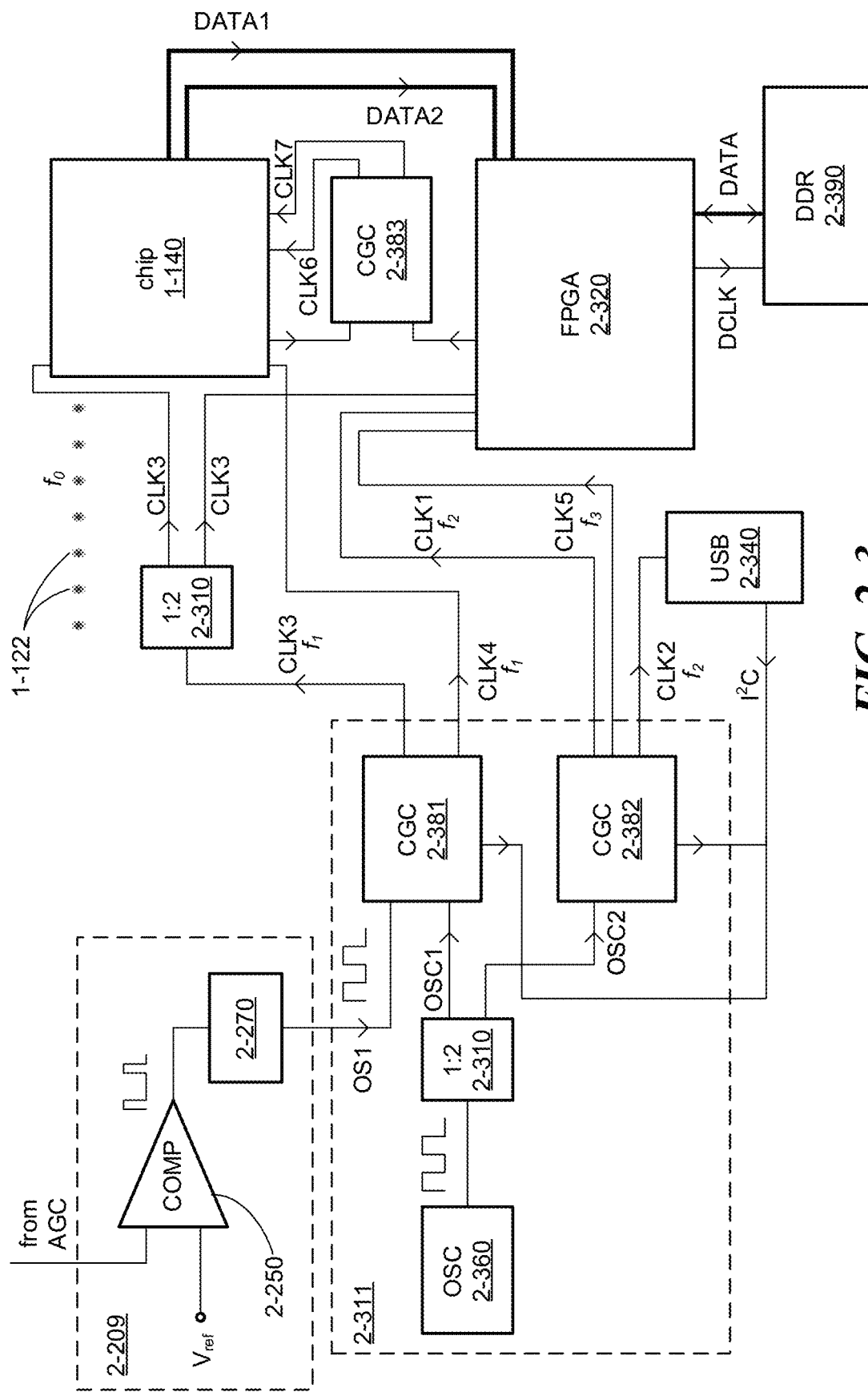
Figures 2, 3:
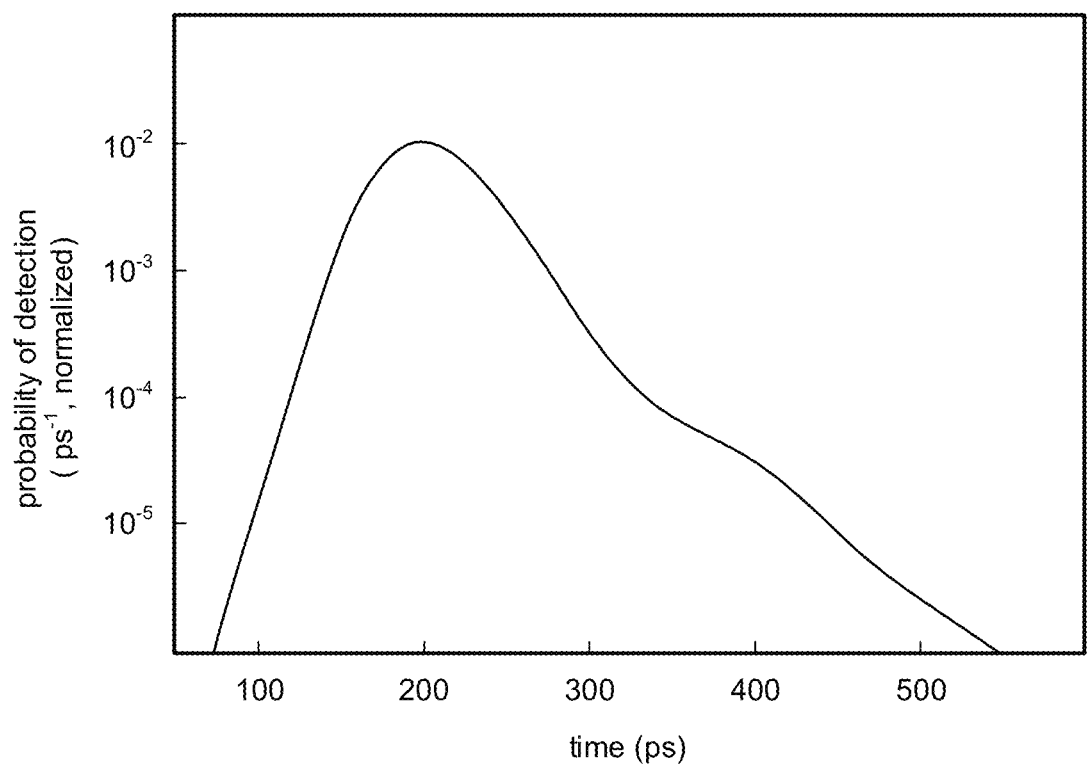
Figure 3:
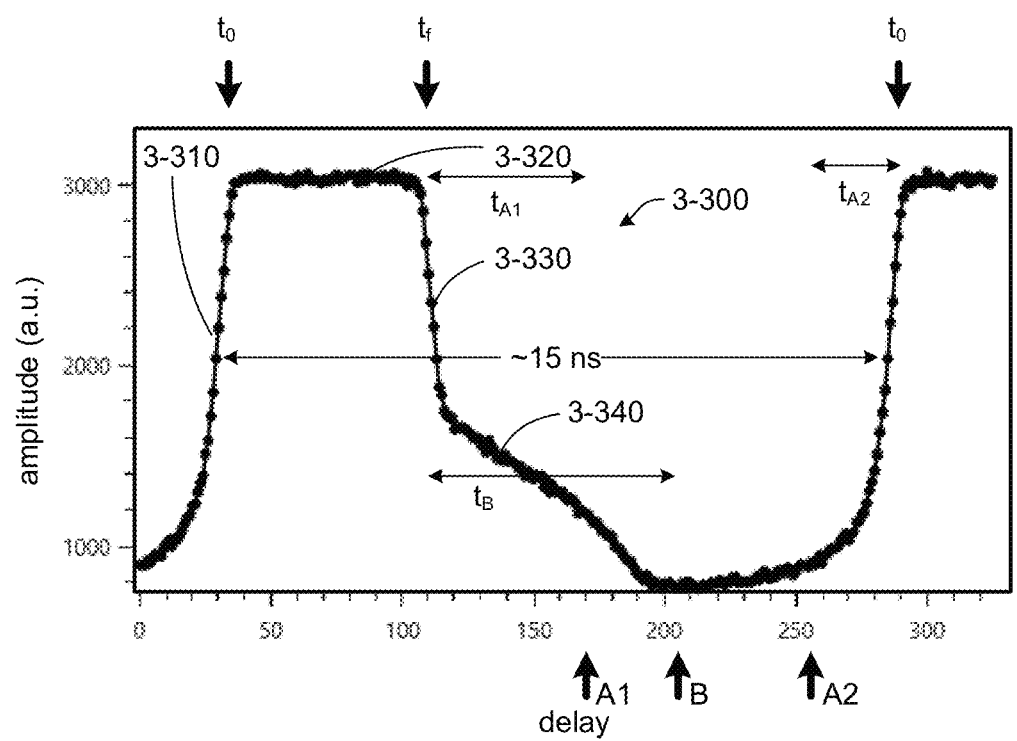
Figures 3, 4:
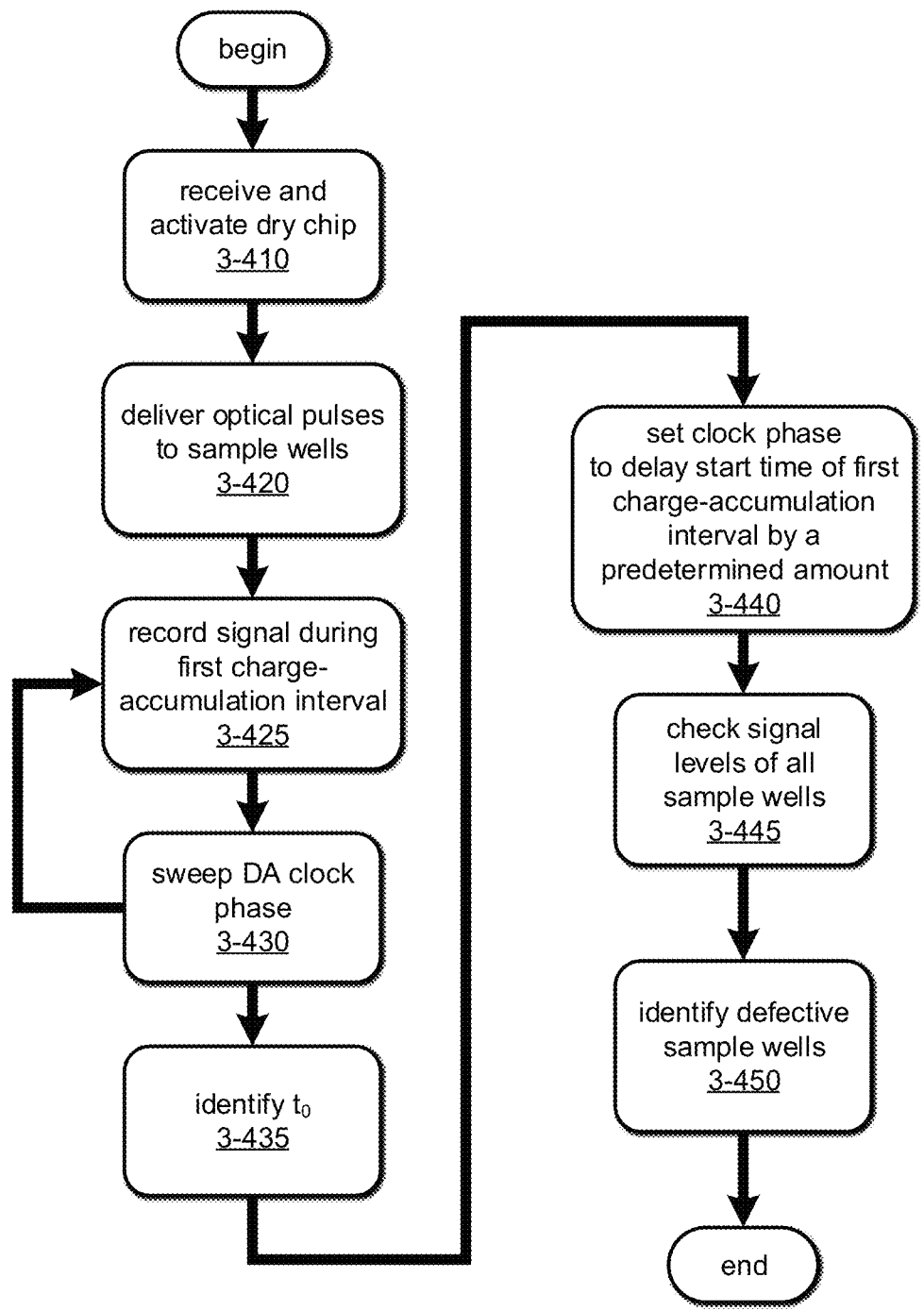
Figures 1, 4:
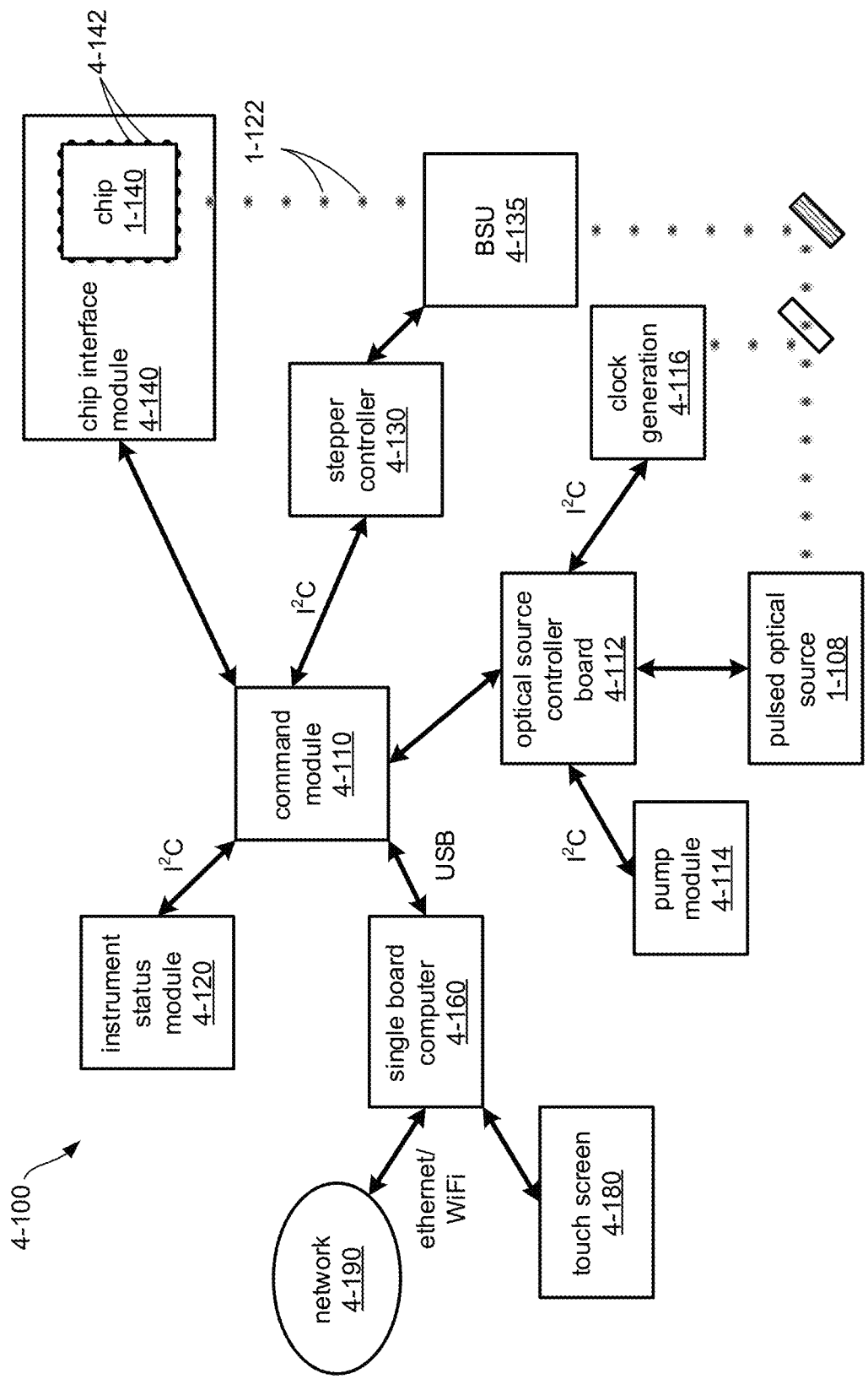
Figures 2, 4:
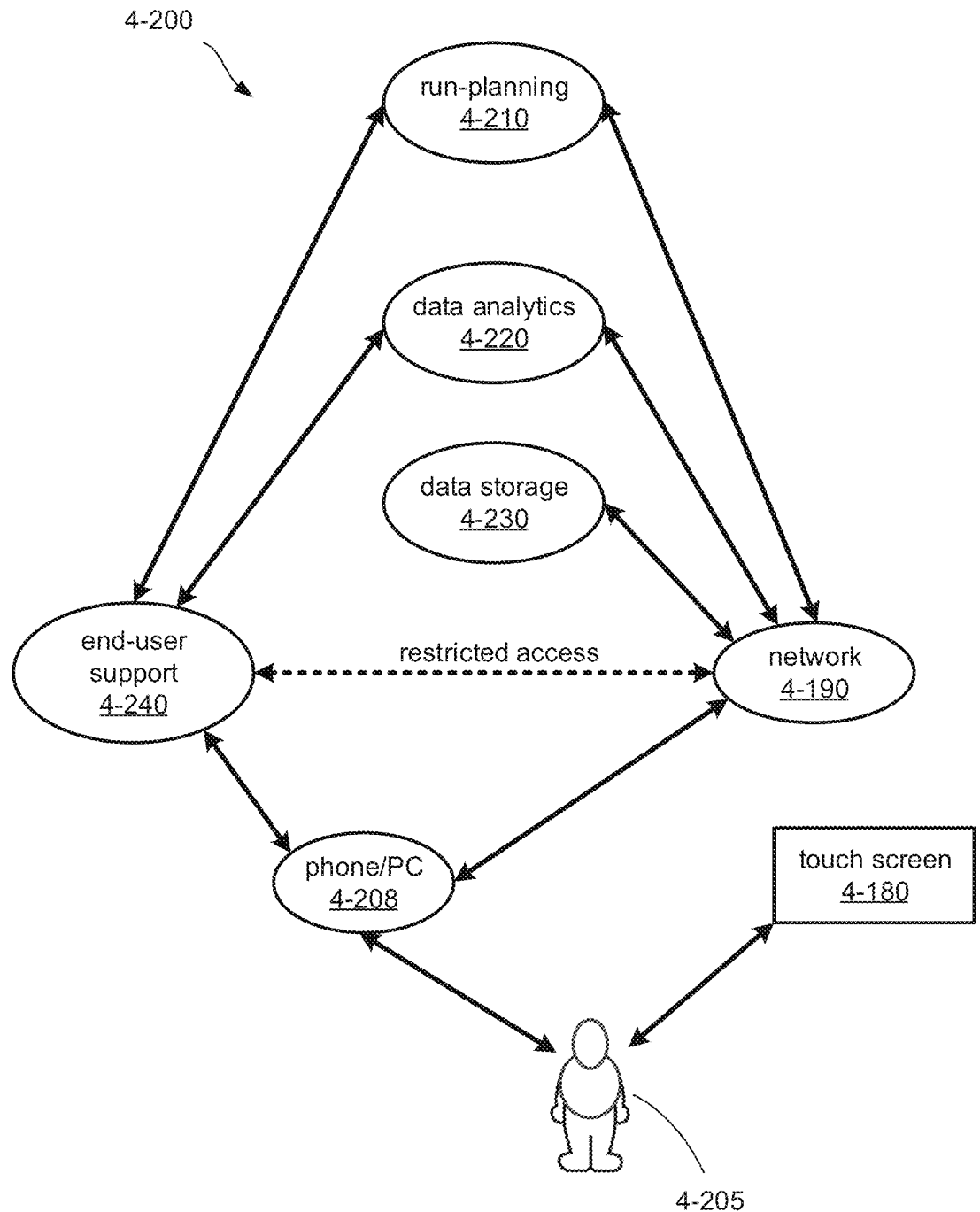

Example acts of a calibration procedure are depicted in the flow chart of FIG. 3-4. A method of calibration may comprise receiving (act 3-410) a dry optoelectronic chip 1-140 in a chip receptacle of an advanced analytic instrument 1-100 and activating the chip electronics for data acquisition. Activating the chip electronics can include providing electrical power from the instrument to the chip 1-140 and receiving signals from one or more sensors located on the chip 1-140. In some implementations, activating the chip electronics may further comprise adjusting voltages on the chip. For example, reference values for one or more analog-to-digital converters (ADCs) that receive analog signal(s) from one or more sensors 1-322 may be adjusted so that a full range of each ADC can be used to cover the range of an input analog signal.

In some implementations, the adjustment to an ADC may adjust a DC offset or dark signal level of the ADC to increase a dynamic range of the photodetector and ADC combination. For example, with no excitation light on a pixel having a photodetector, a dark or baseline signal level from the photodetector is level shifted such that an expected full-light signal (filling the detector's charge-accumulation well) will be within a linear range of the ADC. The expected full-light signal can be based (to first order) on a TCAD simulation of the photodetector, according to some embodiments. Next, the linearity and range of photodetector and ADC can be checked during a chip check procedure by increasing an amount of excitation light to a full amount provided to the chip, and observing that an output from the ADC does not saturate or clip. Further, if clipping from the ADC is observed, then the baseline signal is level shifted to remove the clipping. According to some embodiments, level shift values are approximately consistent from chip to chip, so that level shift values can be stored in memory and applied to each new chip. In some cases, adjustments of ADC offsets may be different for different sections of a chip (e.g., different halves, different quadrants, etc.).

The method may further include delivering optical pulses (act 3-420) to sample wells on the chip, recording (act 3-425) signal levels during at least a first charge-accumulation interval, and sweeping (act 3-430) a phase of a data-acquisition clock between each recorded signal level. The method may further include identifying (act 3-435) from the recorded signal levels a time $t_0$ or corresponding phase point at which a start time of the charge-accumulation window approximately coincides with a peak of the optical excitation pulses, and setting (act 3-440) the phase of the data-acquisition clock such that the start time $t_1$ of the first charge-accumulation window is delayed by a predetermined amount. The act of identifying (act 3-435) a time to may comprising fitting a sigmoid function to at least a portion of the received signal levels and selecting a predetermined value of the fitted sigmoid function as the time $t_0$, according to some embodiments. For example, a sigmoid function may be fit to a rising edge portion of signal levels illustrated in FIG. 3-3. A calibration method may further include evaluating (act 3-445) signal levels for all sample wells and identifying (act 3-450) sample wells with low or abnormal signal levels for which data results should be ignored.

An example of system architecture 4-100 for an advanced analytic instrument 1-100 is depicted in FIG. 4-1. According to some embodiments, overall instrument control can be managed by a central command module 4-110 that communicates with a plurality of other instrument modules through various communication links (e.g., I²C, USB, ribbon cable, custom data link, etc.). In some cases, the command module 4-110 can be formed on a single PCB that mounts in the analytic instrument 1-100. The PCB may plug into a backplane of the instrument, according to some embodiments. Command module 4-110 can comprise a data processor (e.g., microcontroller, microprocessor, or programmable logic controller) that is in communication with memory and programming instructions that adapt the data processor to execute various instrument functionalities. Command module 4-110 can communicate directly with an instrument status manager 4-120, chip interface module 4-140, single board computer 4-160, optical source controller 4-112, and stepper controller 4-130. Arrows on the data links indicate directions in which data can be transmitted between modules.

The chip interface module 4-140 can provide a data-handling interface between the optoelectronic chip 1-140 and the command module 4-110, and can relieve the command module of a data-handling burden due to the volume of data produced by the chip 1-140. In some embodiments, the interface module 4-140 comprises a data processor (e.g., microcontroller, microprocessor, FPGA, programmable logic controller, logic circuitry, or some combination of these components) that is in communication with memory and programming instructions that adapt the data processor to carry out data-handling functionalities (e.g., data preprocessing, data packaging, data transmission, etc.). Hardware for the interface module 4-140 can be assembled on a single PCB that can be installed and replaced as a component in the analytic instrument 1-100. In some cases, the chip interface module 4-140 can be assembled on a board that conforms with the nuclear instrumentation module (NIM) standard, so that the interface module 4-140 can plug into a backplane of the advanced analytic instrument 1-100. In such or similar cases, a receptacle for the chip 1-140 can mount on a separate PCB and communicate with the interface module 4-140 via a multi-wire data link. In some implementations, the data processor of the interface module 4-140 is in communication with a plurality of communication lines running between the chip 1-140 and the chip interface module 4-140. According to some embodiments, a chip interface module 4-140 can include a socket having hundreds of pins or pads 4-142 that contact to mating pads or pins on the chip 1-140 and enable high data transfer rates between the chip 1-140 and interface module 4-140.

Other data may be provided from the optoelectronic chip 1-140 and/or interface module 4-140 to the command module 4-110 in addition to the large amounts of data obtained from sample wells. Additional data can include temperature data from one or more thermal sensors mounted on the chip 1-140, and current and voltage data from a thermo-electric cooler that is in thermal contact with the chip 1-140 when the chip is mounted in the analytic instrument 1-100. Additional data can also include optical power and alignment data measured on the chip 1-140 (e.g., data obtained from monitoring photodiodes 1-324 and quad detectors 1-320 depicted in FIG. 1-3).

Referring again to FIG. 4-1, single board computer 4-160 can include at least one microprocessor, memory, and at least one communication interface that allows the single board computer 4-160 to communicate with other external devices over a network 4-190 such as a local area network, medium area network, wide area network, and/or the world-wide web. Hardware for the single board computer can be assembled on a single PCB that can be installed and replaced as a component in the analytic instrument 1-100. The single board computer 4-160 can also include programming instructions that adapt the single board computer to carry out data-handling functionalities (e.g., data processing, data packaging, data transmission, data receiving, internet communications, etc.). In some implementations, there can be a direct data link or links to shared memory between the chip interface module 4-140 and single board computer 4-160 for transmitting sample well data from the chip 1-140 directly to the single board computer 4-160, bypassing the command module 4-110. In some embodiments, FPGA 2-320 and/or DDR 2-390 may be integrated on a same board with any one of the single board computer 4-160, interface module 4-140, or command module 4-110. Single board computer 4-160 can further communicate with a touch screen 4-180 that can provide a user interface for operating the analytic instrument 1-100. In some embodiments, the single board computer 4-160 communicates with command module 4-110 via a universal serial bus (USB) interface (e.g., a USB 3.0 interface and link).

An optical source controller 4-112 can comprise a data processor (e.g., microcontroller, microprocessor, programmable logic controller, logic circuitry, ASIC, or some combination of these components) that is in communication with memory and programming instructions that adapt the source controller 4-112 to execute functionalities for operating the pulsed optical source 1-108 (e.g., mode-locked laser 1-110). Hardware for the optical source controller board can be assembled on a single PCB that can be installed and replaced as a component in the analytic instrument 1-100. In some embodiments, the PCB may be attached to a chassis on which the pulsed optical source is assembled, so that the optical source controller 4-112 and pulsed optical source 1-108 can be replaced as a single unit. In some cases, the optical source controller 4-112 receives operation data from one or more sensors or devices mounted on the pulsed optical source. For example the optical source controller 4-112 can receive data that indicates the position of alignment optics (e.g., intracavity window(s), mirror(s)) within a cavity of a mode-locked laser 1-110, data indicative of the position of a half-wave plate that is used to control an amount of frequency-doubled power output from a mode-locked laser 1-110, data indicative of an intensity level of a fundamental wavelength output from the mode-locked laser 1-110, data indicative of an intensity level of a frequency-doubled wavelength output from the mode-locked laser 1-110, and data indicative of a temperature of a component (e.g., gain medium) of the mode-locked laser 1-110 or pulsed optical source 1-108.

In some cases when the optical source 1-108 comprises a mode-locked laser, the optical source controller 4-112 also communicates with a pump module 4-114 (e.g., via an $I^2C$ link). The pump module can comprise an electro-optical assembly as described in U.S. patent application Ser. No. 15/844,469 referenced above. Data received from the pump module can include data indicative of the temperature of a pump source (e.g., a high power diode laser), data indicative of an amount of optical power output by the pump source, and data indicative of operational parameters for cooling elements (e.g., fan speed, voltage and/or current values for a thermo-electric cooler) that affect temperature of the pump source.

Optical source controller 4-112 may further communicate (e.g., via an $I^2C$ link) with clock-generation board 4-116. Example components that may be included in a clock-generation board are described above in connection with FIG. 2-2 and FIG. 2-3. In some cases, clock-generation components can be assembled on a single PCB and mounted on a chassis on which the pulsed optical source 1-108 is assembled. In some implementations, data received from the clock-generation board 4-116 can include data indicative of an intensity level of a fundamental wavelength and data indicative of an intensity level of a frequency-doubled wavelength output from the pulsed optical source 1-108. Additional data can include operational settings and parameters associated with clock-generation circuits 2-381, 2-381, according to some embodiments. Data received by the optical source controller 4-112 can be communicated to the command module 4-110.

In embodiments, stepper controller 4-130 may communicate with stepper motors on a beam-steering unit 4-135. The beam-steering unit can comprise movable optical components that are used to control the shape, position, and/or direction of the beam of optical pulses at one or more locations within the analytic instrument 1-100. For example, stepper motors in the beam-steering unit 4-135 can be used to adjust orientations of one or more movable optical components in a beam path between the pulsed optical source 1-108 and optoelectronic chip 1-140 and thereby steer and position the optical pulses 1-122 with respect to the chip 1-140. The steering and positioning of the pulses 1-122 can be executed automatically or semi-automatically after inserting an optoelectronic chip 1-140 into the instrument, so as to improve optical coupling between the pulsed optical source 1-108 and optoelectronic chip 1-140. As an example, an active feedback loop may be executed during instrument operation to maintain stable optical coupling of excitation radiation to the sample wells. During feedback loop operation, data from the optoelectronic chip 1-140 data may be received and analyzed by single-board computer 4-160 and/or command-module 4-110 to provide instructions to stepper motor controller 4-130 to stabilize the position, direction, and/or shape of the optical beam of pulses 1-122 on the grating coupler 1-310. Stepper controller 4-130 can comprise at least one data processor (e.g., microcontroller, microprocessor, or programmable logic controller) that is in communication with memory and programming instructions that adapt the stepper controller to activate one or more stepper motors. Hardware for the stepper controller 4-130 can be assembled on a single PCB that can be installed and replaced as a component in the analytic instrument 1-100, according to some embodiments. In some cases, the stepper controller 4-130 can receive data indicative of stepper motor positions, which can be communicated to the command module 4-110.

According to some embodiments, an analytic instrument 1-100 may include instrument status indicators (e.g., lights, speakers, liquid-crystal display(s), etc.) that provide operational status (e.g., power on light, chip present light, laser active indicator, fault indicators, etc.) of the analytic instrument 1-100. The status indicators may be controlled by an instrument status module 4-120 that is in communication with the command module 4-110 (e.g., via an $I^2C$ link). The instrument status module 4-120 can comprise at least one data processor (e.g., microcontroller, microprocessor, or programmable logic controller) that is in communication with memory and programming instructions that adapt the instrument status module to activate one or more indicators on the instrument. Hardware for the instrument status module 4-120 can be assembled on a single PCB that can be installed and replaced as a component in the analytic instrument 1-100, according to some embodiments.

By communication with each module of the analytic instrument 1-100, the command module 4-110 can monitor data from instrument sensors and evaluate whether the analytic instrument 1-100 is operating correctly and stably. Detected operation errors (e.g., chip over temperature, laser diode pump source over temperature, mode-locked laser operating unstably) can automatically initiate corrective or safety actions (e.g., suspend excitation of sample wells, increase cooling, turn pump source down or off, realign intracavity optics to stabilize the laser). Additionally, logs of instrument sensor data can be recorded for each manufactured advanced analytic instrument 1-100. The sensor data logs may be transmitted over a network 4-190 to a repository where the information can be evaluated to detect trends and predict behavior of the analytic instruments (e.g., data trends that predict subsequent unsatisfactory operation of an instrument and identify a cause of the imminent problem). Such instrument analytic data may be used to take action preemptively and avoid potential operating instabilities or shutdowns.

Subsets of system components can work together and essentially independent of other subsets of system components to carry out specific instrument functionality, according to embodiments. Referring again to FIG. 4-1, the optical source controller board 4-112, pump module 4-114, clock generation circuitry 4-116, and pulsed optical source 1-108 can operated independently of other instrument components during a warm-up phase of the pulsed optical source 1-108, for example. During this warm-up phase, pulses 1-122 may be blocked or otherwise not output to the optoelectronic chip 1-140 until the pulsed optical source has stabilized. Stability of the pulsed optical source 1-108 can be evaluated by analyzing (by the optical source controller board 4-112 or the command module 4-110) output from optical detectors that are arranged on or near the pulsed optical source 1-108 to detect output pulses produced by the pulsed optical source 1-108. The detected output pulses can be at a fundamental wavelength produced by the pulsed optical source 1-108 and/or at a converted, second-harmonic wavelength. Features analyzed can include, but are not limited to, pulse amplitude stability, temperature stability of the pump module 4-114, stability of second-harmonic pulse amplitude or second-harmonic power, stability of a generated clock signal, and stability of pulse-repetition frequency. Once stable operation of the pulsed optical source 1-108 has been detected, the optical source controller board 4-112 may initiate acts that allow optical pulses 1-122 to be output to the optoelectronic chip 1-140 and allow a clock signal that has been generated from the sequence of optical pulses to be output to the optoelectronic chip 1-140 for data acquisition.

Example network services 4-200 that may be accessed by an advanced analytic instrument 1-100 are depicted in FIG. 4-2. Such network services may be accessible via network 4-190. Example network services include, but are not limited to, run-planning services 4-210, data analytic services 4-220, data storage services 4-230, and end-user support services 4-240. An end user 4-205, in some implementations, can access any of these services via the instrument's touch screen 4-180 or by a smart phone or personal computer 4-208 in communication with the analytic instrument 1-100 via the network 4-190. Each of the services can be implemented, at least in part, as programming instructions, executable code, processor(s), data and/or data-storage hardware that is accessible on or through one or more network servers as part of "cloud" based services.

In overview, run-planning services 4-210 can comprise user instructions, recommended instrument settings, instrument setting options, automated control options, etc. that aid a user 4-205 in planning and executing instrument operation (e.g., a gene or protein sequencing run or other sample analysis run). As such, run-planning services 4-210 can include a combination of data (e.g., on-line instructions and recommended settings) and executable code. Example executable code may include scripts that can be downloaded to an analytic instrument 1-100, automatically configure the instrument for operation, and/or assist in execution of a run.

Data analytic services 4-220 can comprise executable code that can reside and run on one or more servers. As an example, data analytic services 4-220 can include on-line big data or machine-learning services, such as Google Cloud and other big data services providers. Data analytic services 4-220 can be used to process data received from the sample wells on the optoelectronic chip 1-140.

Because large amounts of data can be generated from a sequencing run on the optoelectronic chip 1-140, cloud-based data storage services 4-230 may aid in handling the large volumes of data. Data storage services 4-230 may comprise memory available on one or more server farms, in some cases. Data storage services 4-230 may store raw data and/or preprocessed data from a chip 1-140 that will be subsequently analyzed (e.g., by data analytics services 4-220).

In some embodiments, data storage services 4-230 can store additional information for each analytic instrument 1-100 accessed over the network. For example, instrument settings for each sequencing run may be stored in data storage services 4-230, for future reference. In some implementations, instrument sensor data logs, as described above, can be stored in data storage services 4-230 to track performance of one or more instruments placed in service. Such sensor log information may be used to determine when instrument service may be needed and to upgrade or improve instrument operation.

End-user support services 4-240 can comprise general instrument information and operation instructions made available for on-line access. Further information can include trouble-shooting guidance for instrument malfunctions. In some implementations, end-user support services 4-240 may include live chat sessions via the network or a public switched telephone network to aid an end user 4-205 in operating an analytic instrument 1-100. According to some embodiments, end-user support services 4-240 can include restricted access (indicated by the dashed line) to a user's analytic instrument 1-100 on a temporary or permanent basis for remote operation by a certified technician and/or for collection of sensor data logs.

Various configurations and methods relating to data acquisition control for advanced analytic instruments having pulsed optical sources are possible as set forth in the following numbered lists of configurations and methods.

(1) An analytic instrument comprising a pulsed optical source configured to output a sequence of optical pulses for analysis of a sample; and clock-generation circuitry configured to produce a first clock signal derived from the sequence of optical pulses and a second clock signal that is not derived from the sequence of optical pulses and provide the first clock signal and second clock signal to validate data acquisitions for analysis of the sample.

(2) The analytic instrument of configuration (1), further comprising a clock-detection circuit having a detector arranged to detect the sequence of optical pulses and output a clocking signal to the clock-generation circuitry; and a chip interface module having a receptacle arranged to receive an optoelectronic chip that can be placed in the receptacle by a user, wherein the optoelectronic chip is configured to hold the sample for analysis, and wherein the clock-generation circuitry outputs the first clock signal to the chip interface module for timing first data acquisition operations of the optoelectronic chip during operation of the analytic instrument.

(3) The analytic instrument of configuration (2), further comprising a phase-locked loop within the clock-generation circuitry that locks the frequency and phase of a voltage controlled oscillator to a frequency and phase of the clocking signal.

(4) The analytic instrument of configuration (2) or (3), wherein an integration time of a loop filter within the phase-locked loop corresponds to a time extending between approximately 30 of the optical pulses and approximately 80 of the optical pulses.

(5) The analytic instrument of any one of configurations (2) through (4), wherein the clock-generation circuitry is further arranged to output a third clock signal to the chip interface module, wherein the third clock signal oscillates at a frequency less than the first clock signal and is used to time second data acquisition operations of the optoelectronic chip during operation of the analytic instrument.

(6) The analytic instrument of configuration (5) or (6), wherein the first data acquisition operations comprise photodetection of fluorescent emissions from a plurality of sample wells on the optoelectronic chip and the second data acquisition operations comprise photodetection of excitation radiation delivered to the optoelectronic chip.

(7) The analytic instrument of configuration (5), wherein the second data acquisition operations comprise data indicative of alignment of an optical beam to the optoelectronic chip.

(8) The analytic instrument of any one of configurations (1) through (7), further comprising an oscillator in the clock-generation circuitry, wherein the analytic instrument is configured to switch from using the first clock signal to using a third clock signal derived from the oscillator to time the data acquisitions when a disruption in the sequence of optical pulses occurs.

(9) The analytic instrument of configuration (8), wherein the analytic instrument is configured to provide the second clock signal to the chip interface module at a time when the pulsed optical source is not operating.

(10) The analytic instrument of any one of configurations (1) through (9), wherein the second clock signal is derived from an electronic or electro-mechanical oscillator.

(11) The analytic instrument of any one of configurations (1) through (10), further comprising a data processor located on the analytic instrument that is arranged to receive and process sample analysis data.

(12) The analytic instrument of configuration (11), wherein the data processor comprises a field-programmable gate array.

(13) The analytic instrument of configuration (11) or (12), wherein the data processor is configured to receive the first clock signal and the second clock signal and determine whether to accept or reject at least some of the data acquisitions for subsequent data processing based upon the received first and second clock signals.

(14) The analytic instrument of any one of configurations (11) through (13), wherein the data processor is configured to use the second clock signal for timing data-processing operations in the data processor.

(15) The analytic instrument of configuration (14), wherein the first clock signal is also provided to the data processor and the data processor is configured to validate the data acquisitions by comparing the first clock signal and the second clock signal to determine whether data is received at a correct time for subsequent data processing by the data processor.

(16) The analytic instrument of configuration (14) or (15), wherein the first clock signal is also provided to the data processor and the data processor is arranged to detect synchronization discrepancies between the first clock signal and the second clock signal and adjust timing of data-processing operations in response to detecting the synchronization discrepancies.

(17) The analytic instrument of any one of configurations (14) through (16), further comprising an electronic or electro-mechanical oscillator operating at a frequency of oscillation that is less than a frequency of the first clock signal and the clock-generation circuitry translates the frequency of oscillation of the electronic or electro-mechanical oscillator to essentially a frequency of the first clock signal.

(18) The analytic instrument of any one of configurations (1) through (17), wherein the pulsed optical source comprises a passively mode-locked laser that autonomously determines its pulse repetition rate.

(19) The analytic instrument of any one of configurations (1) through (18), wherein the optical pulses are provided to an optoelectronic chip to excite fluorophores at one or more sample wells for sequencing DNA.

(20) The analytic instrument of any one of configurations (1) through (19), wherein the optical pulses are provided to an optoelectronic chip to excite fluorophores at one or more sample wells for sequencing proteins.

One or more of the above configurations may be used to implement steps of one or more methods listed below.

(21) A method of operating an analytic instrument, the method comprising: detecting a sequence of optical pulses and generating a first clock signal derived from the sequence of optical pulses; providing the optical pulses for analysis of a sample; generating a second clock signal from an oscillator that is not synchronized to the sequence of optical pulses; and providing the first clock signal and second clock signal to a data processor for validating data acquisition operations during the analysis of the sample.

(22) The method of (21), further comprising: detecting the sequence of optical pulses with a detector and outputting a clocking signal based on the detected sequence of optical pulses; deriving the first clock signal from the clocking signal for a first period of time; and providing to a chip interface module the first clock signal, wherein the chip interface module includes a receptacle arranged to receive an optoelectronic chip that can be placed in the receptacle by a user and wherein the optoelectronic chip is configured to hold the sample for the analysis of the sample.

(23) The method of (21) or (22), further comprising timing first data acquisition operations of the optoelectronic chip during operation of the analytic instrument using the first clock signal.

(24) The method of (22) or (23), further comprising: deriving the first clock signal from an oscillator for a second period of time; timing first data acquisition operations of the optoelectronic chip during operation of the analytic instrument using the first clock signal during the first period of time; and timing second data acquisition operations of the optoelectronic chip during operation of the analytic instrument using the first clock signal during the second period of time.

(25) The method of (23) or (24), further comprising switching to deriving the first clock signal from the oscillator when a disruption in the sequence of optical pulses occurs.

(26) The method of any one of (23) through (25), wherein deriving the first clock signal from an oscillator for a second period of time comprises translating a frequency of oscillation of an electronic or electro-mechanical oscillator to essentially a frequency of the sequence of optical pulses.

(27) The method of any one of (21) through (26), further comprising providing data from the data acquisition operations to a network-based data analytic service.

(28) The method of any one of (21) through (27), further comprising providing data from sensors that monitor performance of the analytic instrument to a network-based instrument support service.

(29) The method of any one of (21) through (28), further comprising deriving the second clock signal from an electronic or electro-mechanical oscillator.

(30) The method of any one of (21) through (29), further comprising: receiving, at the data processor, data from a chip interface module, wherein the chip interface module includes a receptacle arranged to receive an optoelectronic chip that can be placed in the receptacle by a user and wherein the optoelectronic chip is configured to hold the sample for the analysis of the sample; and determining, by the data processor, whether to accept or reject at least some of the data for subsequent data processing based upon the received first and second clock signals.

(31) The method of (30), wherein the data processor comprises a field-programmable gate array.

(32) The method of any one of (29) through (31), further comprising: detecting a synchronization discrepancy between the first clock signal and the second clock signal; and adjusting timing of data-processing operations in response to detecting the synchronization discrepancy.

(33) The method of any one of (29) through (32), further comprising timing data-processing operations of the data processor with the second clock signal.

(34) The method of any one of (21) through (33), further comprising producing the sequence of optical pulses with a passively mode-locked laser that autonomously determines its pulse repetition rate.

(35) The method of any one of (21) through (34), further comprising: outputting, by the clock-generation circuitry, a third clock signal to a chip interface module, wherein the third clock signal oscillates at a frequency less than the first clock signal and wherein the chip interface module includes a receptacle arranged to receive an optoelectronic chip that can be placed in the receptacle by a user and wherein the optoelectronic chip is configured to hold the sample for the analysis of the sample; timing first data acquisition operations of the optoelectronic chip with the first clock signal; and timing second data acquisition operations of the optoelectronic chip with the third clock signal.

(36) The method of (35), wherein the first data acquisition operations comprise photodetection of fluorescent emission from a plurality of sample wells on the optoelectronic chip and the second data acquisition operations comprise photodetection of excitation radiation delivered to the optoelectronic chip.

(37) A method for timing charge-accumulation intervals in a photodetector, the method comprising: providing optical excitation pulses to excite a sample; generating a first clock signal that is synchronized to the optical excitation pulses; initiating, with the first clock signal, a starting time of a first charge-accumulation interval for the photodetector; delaying the first clock signal while detecting an output from the photodetector; recording signal levels from a first charge-accumulation interval as a function of delay of the first clock signal; identifying a reference point in the recorded signal levels; and setting a delay of the first clock signal such that the starting time is delayed from the reference point by a predetermined amount.

(38) The method of (37), wherein the photodetector has a second charge-accumulation interval that follows the first charge-accumulation interval and is longer than the first charge-accumulation interval.

(39) The method of (37) or (38), wherein the predetermined amount locates the first charge-accumulation interval such that a probability of detecting one excitation photon from the optical excitation pulses for all first charge-accumulation intervals for a frame of data is less than the probability of detecting one emission photon from the sample.

(40) The method of any one of (37) through (39), wherein the predetermined amount locates a start time of the first charge-accumulation interval approximately at a minimum value of the recorded signal levels.

(41) The method of any one of (37) through (40), further comprising: delivering the optical excitation pulses to a plurality of sample wells on an optoelectronic chip; and executing the acts of initiating, delaying, recording, identifying, and setting for a plurality of photodetectors on the optoelectronic chip.

(42) The method of (41), further comprising determining whether a sample well is operable based on an amount of signal from the optical excitation pulses detected at the sample well.

(43) The method of (41) or (42), further comprising: generating a second clock signal having a frequency different from the first clock signal; and providing the second clock signal to the optoelectronic chip, wherein the second clock signal controls the starting times of charge-accumulation intervals for one or more alignment photodetectors that sense alignment of the optical excitation pulses to the optoelectronic chip.

(44) The method of any one of (41) through (43), wherein the first clock signal is derived from a clock-detection circuit that detects a sequence of the optical excitation pulses.

(45) The method of any one of (41) through (44), further comprising clocking transmission of data from the sample wells to a data processor using the first clock signal.

IV. Conclusion

Having thus described several aspects of several embodiments of system architecture for an advanced analytic system 1-100, it is to be appreciated that various alterations, modifications, and improvements will readily occur to those skilled in the art. Such alterations, modifications, and improvements are intended to be part of this disclosure, and are intended to be within the spirit and scope of the invention. While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated, those of ordinary skill in the art will readily envision a variety of other means and/or structures for performing the function and/or obtaining the results and/or one or more of the advantages described, and each of such variations and/or modifications is deemed to be within the scope of the inventive embodiments described. More generally, those skilled in the art will readily appreciate that all parameters, dimensions, materials, and configurations described are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure may be directed to each individual feature, system, system upgrade, and/or method described. In addition, any combination of two or more such features, systems, and/or methods, if such features, systems, system upgrade, and/or methods are not mutually inconsistent, is included within the inventive scope of the present disclosure.

Further, though some advantages of the present invention may be indicated, it should be appreciated that not every embodiment of the invention will include every described advantage. Some embodiments may not implement any features described as advantageous. Accordingly, the foregoing description and drawings are by way of example only.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used are for organizational purposes only and are not to be construed as limiting the subject matter described in any way.

Also, the technology described may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used, should be understood to control over dictionary definitions, definitions in documents incorporated by reference, and/or ordinary meanings of the defined terms.

Numerical values and ranges may be described in the specification and claims as approximate or exact values or ranges. For example, in some cases the terms "about," "approximately," and "substantially" may be used in reference to a value. Such references are intended to encompass the referenced value as well as plus and minus reasonable variations of the value. For example, a phrase "between about 10 and about 20" is intended to mean "between exactly 10 and exactly 20" in some embodiments, as well as "between $10\pm\delta1$ and $20\pm\delta2$" in some embodiments. The amount of variation $\delta1$, $\delta2$ for a value may be less than 5% of the value in some embodiments, less than 10% of the value in some embodiments, and yet less than 20% of the value in some embodiments. In embodiments where a large range of values is given, e.g., a range including two or more orders of magnitude, the amount of variation $\delta1$, $\delta2$ for a value could be as high as 50%. For example, if an operable range extends from 2 to 200, "approximately 80" may encompass values between 40 and 120 and the range may be as large as between 1 and 300. When exact values are intended, the term "exactly" is used, e.g., "between exactly 2 and exactly 200." The term "essentially" is used to indicate within 3% of a target value.

The term "adjacent" may refer to two elements arranged within close proximity to one another (e.g., within a distance that is less than about one-fifth of a transverse or vertical dimension of a larger of the two elements). In some cases there may be intervening structures or layers between adjacent elements. In some cases adjacent elements may be immediately adjacent to one another with no intervening structures or elements.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. An analytic instrument comprising:
a pulsed optical source configured to output a sequence of optical pulses for analysis of a sample; and
clock-generation circuitry configured to produce a first clock signal derived from the sequence of optical pulses and a second clock signal that is not derived from the sequence of optical pulses and provide the first clock signal and second clock signal to validate data acquisitions for analysis of the sample.

2. The analytic instrument of claim 1, further comprising:
a clock-detection circuit having a detector arranged to detect the sequence of optical pulses and output a clocking signal to the clock-generation circuitry;
a chip interface module having a receptacle arranged to receive an optoelectronic chip that can be placed in the receptacle by a user, wherein the optoelectronic chip is configured to hold the sample for analysis, and wherein the clock-generation circuitry outputs the first clock signal to the chip interface module for timing first data acquisition operations of the optoelectronic chip during operation of the analytic instrument.

3. The analytic instrument of claim 2, further comprising a phase-locked loop within the clock-generation circuitry that locks the frequency and phase of a voltage controlled oscillator to a frequency and phase of the clocking signal.

4. The analytic instrument of claim 3, wherein an integration time of a loop filter within the phase-locked loop corresponds to a time extending between approximately 30 of the optical pulses and approximately 80 of the optical pulses.

5. The analytic instrument of claim 2, wherein the clock-generation circuitry is further arranged to output a third clock signal to the chip interface module, wherein the third clock signal oscillates at a frequency less than the first clock signal and is used to time second data acquisition operations of the optoelectronic chip during operation of the analytic instrument.

6. The analytic instrument of claim 5, wherein the first data acquisition operations comprise photodetection of fluorescent emissions from a plurality of sample wells on the optoelectronic chip and the second data acquisition operations comprise photodetection of excitation radiation delivered to the optoelectronic chip.

7. The analytic instrument of claim 5, wherein the second data acquisition operations comprise data indicative of alignment of an optical beam to the optoelectronic chip.

8. The analytic instrument of claim 1, further comprising an oscillator in the clock-generation circuitry, wherein the analytic instrument is configured to switch from using the first clock signal to using a third clock signal derived from the oscillator to time the data acquisitions when a disruption in the sequence of optical pulses occurs.

9. The analytic instrument of claim 8, wherein the analytic instrument is configured to provide the second clock signal to the chip interface module at a time when the pulsed optical source is not operating.

10. The analytic instrument of claim 1, wherein the second clock signal is derived from an electronic or electro-mechanical oscillator.

11. The analytic instrument of claim 1, further comprising a data processor located on the analytic instrument that is arranged to receive and process sample analysis data.

12. The analytic instrument of claim 11, wherein the data processor comprises a field-programmable gate array.

13. The analytic instrument of claim 11, wherein the data processor is configured to receive the first clock signal and the second clock signal and determine whether to accept or reject at least some of the data acquisitions for subsequent data processing based upon the received first and second clock signals.

14. The analytic instrument of claim 11, wherein the data processor is configured to use the second clock signal for timing data-processing operations in the data processor.

15. The analytic instrument of claim 14, wherein the first clock signal is also provided to the data processor and the data processor is configured to validate the data acquisitions by comparing the first clock signal and the second clock signal to determine whether data is received at a correct time for subsequent data processing by the data processor.

16. The analytic instrument of claim 14, wherein the first clock signal is also provided to the data processor and the data processor is arranged to detect synchronization discrepancies between the first clock signal and the second clock signal and adjust timing of data-processing operations in response to detecting the synchronization discrepancies.

17. The analytic instrument of claim 14, further comprising an electronic or electro-mechanical oscillator operating at a frequency of oscillation that is less than a frequency of the first clock signal and the clock-generation circuitry translates the frequency of oscillation of the electronic or electro-mechanical oscillator to essentially a frequency of the first clock signal.

18. The analytic instrument of claim 1, wherein the pulsed optical source comprises a passively mode-locked laser that autonomously determines its pulse repetition rate.

19. The analytic instrument of claim 1, wherein the optical pulses are provided to an optoelectronic chip to excite fluorophores at one or more sample wells for sequencing DNA.

20. The analytic instrument of claim 1, wherein the optical pulses are provided to an optoelectronic chip to excite fluorophores at one or more sample wells for sequencing proteins.

21. A method of operating an analytic instrument, the method comprising:
detecting a sequence of optical pulses and generating a first clock signal derived from the sequence of optical pulses;
providing the optical pulses for analysis of a sample;
generating a second clock signal from an oscillator that is not synchronized to the sequence of optical pulses; and
providing the first clock signal and second clock signal to a data processor for validating data acquisition operations during the analysis of the sample.

22. The method of claim 21, further comprising:
detecting the sequence of optical pulses with a detector and outputting a clocking signal;
deriving the first clock signal from the clocking signal for a first period of time; and
providing to a chip interface module the first clock signal, wherein the chip interface module includes a receptacle arranged to receive an optoelectronic chip that can be placed in the receptacle by a user and wherein the optoelectronic chip is configured to hold the sample for the analysis of the sample.

23. The method of claim 22, further comprising timing first data acquisition operations of the optoelectronic chip during operation of the analytic instrument using the first clock signal.

24. The method of claim 22, further comprising:
deriving the first clock signal from an oscillator for a second period of time;
timing first data acquisition operations of the optoelectronic chip during operation of the analytic instrument using the first clock signal during the first period of time; and
timing second data acquisition operations of the optoelectronic chip during operation of the analytic instrument using the first clock signal during the second period of time.

25. The method of claim 24, further comprising switching to deriving the first clock signal from the oscillator when a disruption in the sequence of optical pulses occurs.

26. The method of claim 24, wherein deriving the first clock signal from an oscillator for a second period of time comprises translating a frequency of oscillation of an electronic or electro-mechanical oscillator to essentially a frequency of the sequence of optical pulses.

27. The method of claim 22, further comprising providing data from the data acquisition operations to a network-based data analytic service.

28. The method of claim 22, further comprising providing data from sensors that monitor performance of the analytic instrument to a network-based instrument support service.

29. The method of claim 21, further comprising deriving the second clock signal from an electronic or electro-mechanical oscillator.

30. The method of claim 21, further comprising:
receiving, at the data processor, data from a chip interface module, wherein the chip interface module includes a receptacle arranged to receive an optoelectronic chip that can be placed in the receptacle by a user and wherein the optoelectronic chip is configured to hold the sample for the analysis of the sample; and
determining, by the data processor, whether to accept or reject at least some of the data for subsequent data processing based upon the received first and second clock signals.

31. The method of claim 30, wherein the data processor comprises a field-programmable gate array.

32. The method of claim 30, further comprising:
detecting a synchronization discrepancy between the first clock signal and the second clock signal; and
adjusting timing of data-processing operations in response to detecting the synchronization discrepancy.

33. The method of claim 30, further comprising timing data-processing operations of the data processor with the second clock signal.

34. The method of claim 21, further comprising producing the sequence of optical pulses with a passively mode-locked laser that autonomously determines its pulse repetition rate.

35. The method of claim 21, further comprising:
outputting, by the clock-generation circuitry, a third clock signal to a chip interface module, wherein the third clock signal oscillates at a frequency less than the first clock signal and wherein the chip interface module includes a receptacle arranged to receive an optoelectronic chip that can be placed in the receptacle by a user and wherein the optoelectronic chip is configured to hold the sample for the analysis of the sample;
timing first data acquisition operations of the optoelectronic chip with the first clock signal; and
timing second data acquisition operations of the optoelectronic chip with the third clock signal.

36. The method of claim 35, wherein the first data acquisition operations comprise photodetection of fluorescent emission from a plurality of sample wells on the optoelectronic chip and the second data acquisition operations comprise photodetection of excitation radiation delivered to the optoelectronic chip.

* * * * *